US005535869A

United States Patent [19]
Bigley et al.

[11] Patent Number: 5,535,869
[45] Date of Patent: Jul. 16, 1996

[54] PULSE ACTUATED CLUTCH FOR VEHICLE DRIVE LINES

[75] Inventors: Jon A. Bigley, Milwaukie, Oreg.; Evan R. Baker, Vancouver, Wash.

[73] Assignee: Warn Industries, Inc., Milwaukie, Oreg.

[21] Appl. No.: 143,086

[22] Filed: Oct. 26, 1993

[51] Int. Cl.$^6$ .............................. F16D 11/00; F16D 25/04
[52] U.S. Cl. .................. 192/69.41; 192/85 A; 192/85 V; 192/86; 192/88 A; 192/92; 192/114 R
[58] Field of Search .................................. 192/86, 88 A, 192/85 V, 85 A, 92, 114 R, 114 T, 67 R, 69.41; 180/233

[56] References Cited

U.S. PATENT DOCUMENTS

| | | |
|---|---|---|
| 2,671,354 | 3/1954 | Goos . |
| 2,928,374 | 3/1960 | Bergonzo . |
| 3,125,363 | 3/1964 | Kapusta . |
| 3,298,357 | 1/1967 | Bross . |
| 3,464,774 | 9/1969 | Vetter . |
| 3,653,777 | 4/1972 | Bross . |
| 3,656,598 | 4/1972 | Goble . |
| 3,679,317 | 7/1972 | Larson . |
| 3,709,343 | 1/1973 | Sigg . |
| 4,453,852 | 6/1984 | Gilcrest . |
| 4,625,846 | 12/1986 | Gomez . |
| 4,627,512 | 12/1986 | Clohessy . |
| 4,694,943 | 9/1987 | Petrak . |
| 4,960,192 | 10/1990 | Kurihara . |
| 5,085,304 | 2/1992 | Barroso . |
| 5,123,513 | 6/1992 | Petrak .................................. 192/86 X |
| 5,141,088 | 8/1992 | Kurihara et al. . |
| 5,148,901 | 9/1992 | Kurihara et al. . |
| 5,413,201 | 5/1995 | Vidal .................................. 192/67 R |

*Primary Examiner*—Rodney H. Bonck
*Attorney, Agent, or Firm*—Klarquist, Sparkman, Campbell, Leigh & Whinston

[57] ABSTRACT

An impulse actuated clutch with latch for a drive line of a vehicle. The impulse actuated clutch has a coupling member that is permanently engaged with one of a driven member and a driving member. The coupling member is movable in a first direction to engage one of the driven and driving members and is movable in a second direction to engage both the driven and driving members. The coupling member is biased to move in the first direction by a return spring. The coupling member is moved in the second direction by a first pulse of air pressure applied to a piston assembly connected to the coupling member. Formations formed on a primary piston of the piston assembly and the driven member cooperatively latch the piston in the second position to the maintain the coupling member in engagement with both the driven and driving members upon release of the first pulse of air pressure. A second pulse of air pressure greater in magnitude than the first pulse moves the primary piston further in the second direction against a second spring, which unlatches the piston permitting the piston and coupling member to move in the first direction to uncouple the driven member from the driving member.

19 Claims, 16 Drawing Sheets

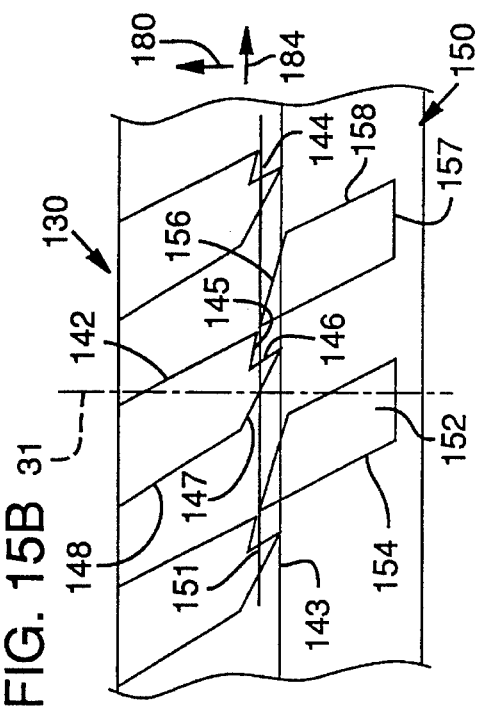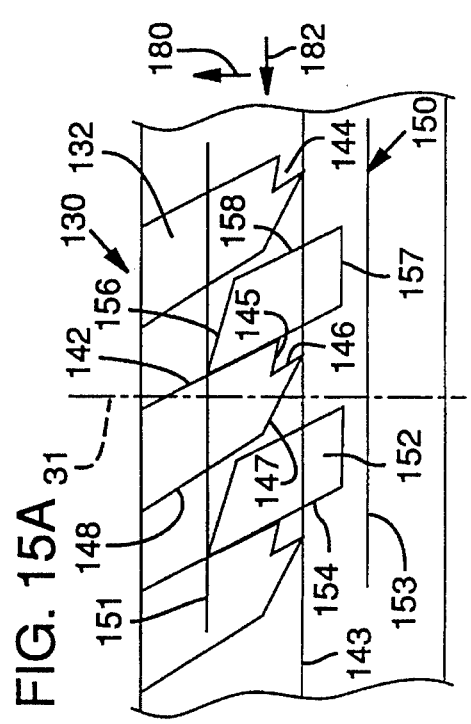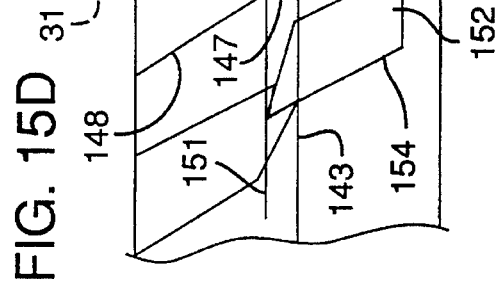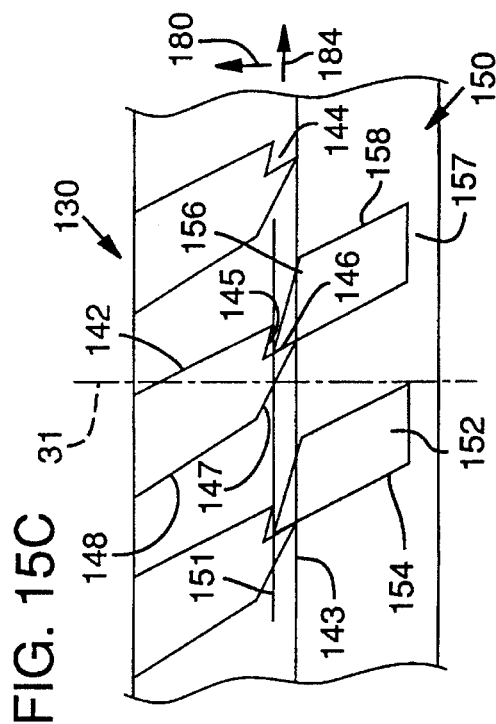

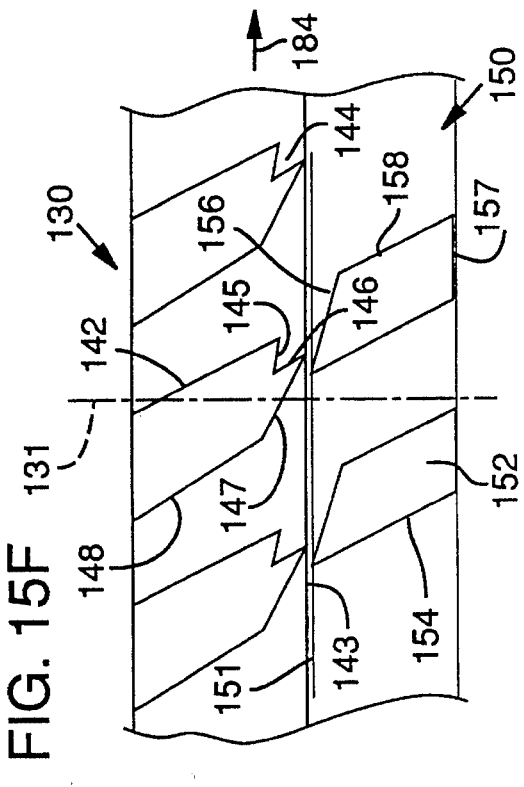
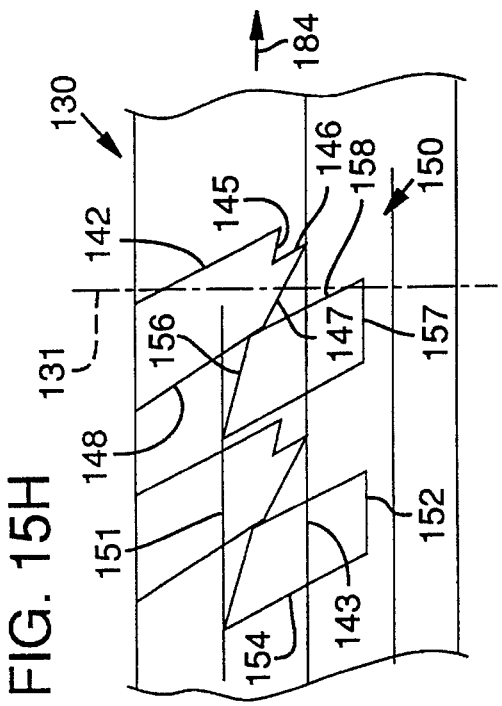
FIG. 15E
FIG. 15F
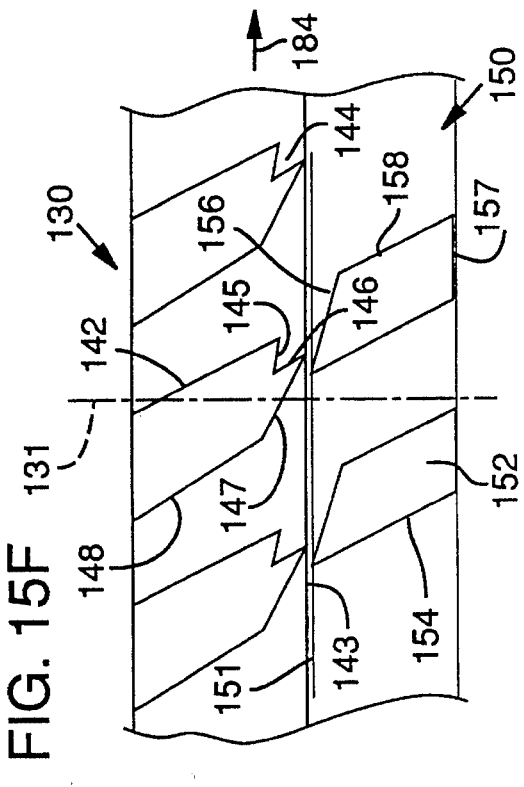
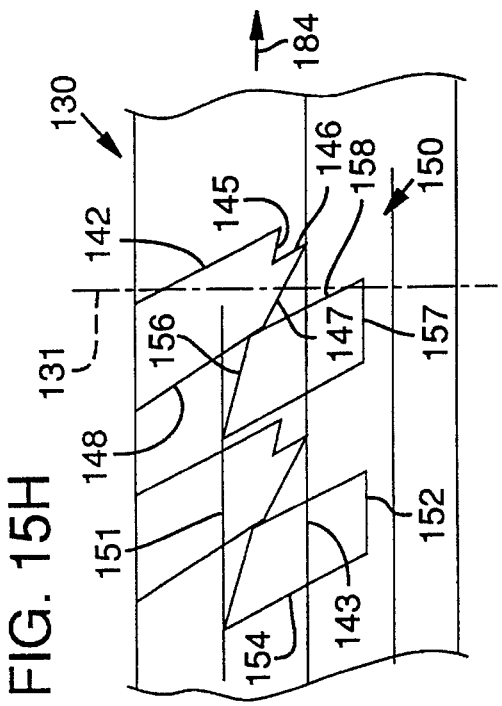
FIG. 15G
FIG. 15H

PULSE ACTUATED CLUTCH FOR VEHICLE DRIVE LINES

BACKGROUND INFORMATION

1. Field of the Invention

This invention relates to clutching mechanisms for components of a drive train of a vehicle and particularly to a clutch mechanism actuated by a momentary biasing pulse.

1. Background of the Invention

This invention has particular application to locking hubs (hub locks) for vehicles which converts two-wheel drive to four-wheel drive. Typically such vehicles have two wheels, (e.g., the back wheels) that are permanently interconnected to the vehicle's drive line. The drive line also extends to the front two wheels but clutch mechanisms are provided for each of the front wheels that enables disconnecting and connecting each of the front wheels to a front drive axle of the drive line. Various types of control mechanisms are employed to actuate the clutch mechanisms. Typically the control mechanism of each wheel moves a clutch ring that will either become engaged with both the wheel hub and the drive axle or the clutch ring will be moved to be engaged with only one member, either the wheel hub or the drive axle. For purposes of discussion, the clutch ring will hereafter be referred to as permanently engaged with the wheel hub and is movable into engagement and out of engagement with the drive axle. The clutch rings of each front wheel when moved to be engaged with both the wheel hub and the drive axle provides for four wheel drive mode, that is the drive axles of the vehicle will drive all four wheels. The clutch rings of each wheel when moved to a position where they engage only the wheel hub disconnects the wheel hub from the drive axle and provides for two wheel drive mode.

The control mechanism can be manually actuated or automatically actuated. The automatic controls can be mechanically actuated (typically cam actuated) or pressure actuated (such as by positive or negative air pressure).

Pressure actuation has a number of advantages but also some serious disadvantages. The actuating mechanism is housed within the wheel hub. A piston is moved back and forth by changing the pressure relationship as between the two sides of the piston. The air pressure on one side has to be variable and, thus, requires an enclosure to create an air tight chamber that is connected to an air pressure source. The air pressure source is readily available on engine powered vehicles (e.g., negative air pressure is drawn to the manifold) but the air chamber encompasses moving parts that requires sealing. Several different seals are required for creating the air tight chamber within the wheel hub.

Typically the piston is biased to move in one direction to a first position by a spring. The application of air pressure opposes the spring pressure to move the piston in the opposite direction to a second position. The piston is maintained in the second position only so long as the air pressure is maintained at a level to overcome the spring. A leak in any one of the several seals can produce malfunction of the clutch. In addition to the possibility of malfunction due to seal leakage, the piston will not be maintained in the second position when the pressure is lost, such as by stopping the vehicle engine. The mechanism will have to be actuated again once the engine is restarted to move the piston to the second position.

BRIEF SUMMARY OF THE INVENTION

A preferred embodiment of the present invention is an automatic clutch mechanism fitted in a wheel hub of a vehicle. The clutch mechanism couples and uncouples the wheel hub to a drive axle of the vehicle. A clutch mechanism of the present invention is provided in each front wheel hub of the vehicle. The coupling and uncoupling of the wheel hubs to the drive axles provides for the selective mode of driving the vehicle either in four wheel drive or two wheel drive.

A clutch ring is provided within the wheel hub to facilitate the coupling and uncoupling of the wheel hub to the drive axle. The clutch ring is in permanent splined engagement with the wheel hub but is slidably movable along the hub splines. The clutch ring is movable to a position to be in splined engagement with only the hub and to a position where the clutch ring is in splined engagement with both the hub and a splined end of the drive axle. The wheel hub, clutch ring and drive axle have a common axis of rotation. The clutch ring is biased by a return spring to be out of engagement with the drive axle.

A piston assembly in abutment with the clutch ring is provided to move the clutch ring into engagement with the drive axle. A cylindrical end of a primary piston of the piston assembly has peripheral helical cam surfaces with formed first and second steps defining a notch therebetween. The cam surfaces of the primary piston are mated with helical cam surfaces of an index ring of the hub. An elastomeric diaphragm is loosely fitted to the primary piston and is fixedly attached to the hub adjacent the index ring. The diaphragm seals the end of the hub and the diaphragm in cooperation with other seals of the hub form an air tight chamber. Movement of the piston assembly is affected by applying a pulse of negative air pressure to the air tight chamber of the hub. The negative air pressure is sufficient to force movement of the piston assembly (and thus the clutch ring) to collapse the return spring. The clutch ring is moved into splined engagement with the drive axle with the clutch ring coming into abutment with a retainer which resists further movement. As the piston assembly is moved the primary piston is forced to rotate by the cooperative action of the helical cam surfaces of the primary piston and index ring. This forced rotation will twist the diaphragm slightly which provides a biasing torque on the primary piston. When the piston assembly has moved the clutch ring into abutment with the retainer, the first step of the primary piston will clear the end (tip) of the index ring cam. The biasing torque provided by the diaphragm will rotate the primary piston so that the end (tip) of the index cam will be seated in the notch of the primary piston cam. The negative air pressure is now released. The end (tip) of the index ring cam seated in the notch of the primary piston cam will prevent the return spring from forcing the clutch ring out of engagement with the drive axle. The clutch mechanism is in a latched position.

The clutch mechanism is unlatched and the clutch ring is moved out of engagement with the drive axle by applying another pulse of negative air pressure. The piston assembly includes a secondary piston movably mounted in the primary piston and is biased to move relative to the primary piston by a second spring. The secondary piston is in abutment with the clutch ring. The second pulse of negative air pressure is greater than the initial negative air pressure and is sufficient to move the primary piston to collapse (compress) the second spring. As the primary piston moves to collapse the second spring, it is once again rotated by the cooperative action of the cam surfaces of the primary piston and index ring which again twist the diaphragm to provide a biasing torque. As the primary piston moves to collapse the second spring, the second step of piston cam will clear the tip of the index ring cam and the biasing torque provided by the diaphragm will rotate the primary piston to move the second step of the primary piston past the tip of the cam of the index ring. Pressure is released and the return spring urges the clutch ring to move out of engagement with the drive axle. As the clutch ring is urged to move out of engagement with the drive axle, an edge of the primary piston cam adjacent the notch will be in sliding engagement with an edge of the cam of the index ring adjacent the tip. The edges of the cams of the primary piston and index ring will cooperatively force rotation of the piston so that the opposite sides of the helical cams are in contact permitting the return of the piston assembly and the uncoupling of the clutch ring with the drive axle.

Controls are provided for controlling the level and duration of each pulse of negative air pressure required to affect the coupling and the uncoupling of the hub to the drive axle by movement of the clutch ring.

Refer now to the drawings and the detailed description for a complete understanding of the invention.

BRIEF DESCRIPTION OF THE DRAWINGS

FIGS. 15A–15H are views showing the positional relation between the cams of the piston and an index ring of the wheel hub of FIG. 10;

DESCRIPTION OF THE PREFERRED EMBODIMENT

Figure 1:
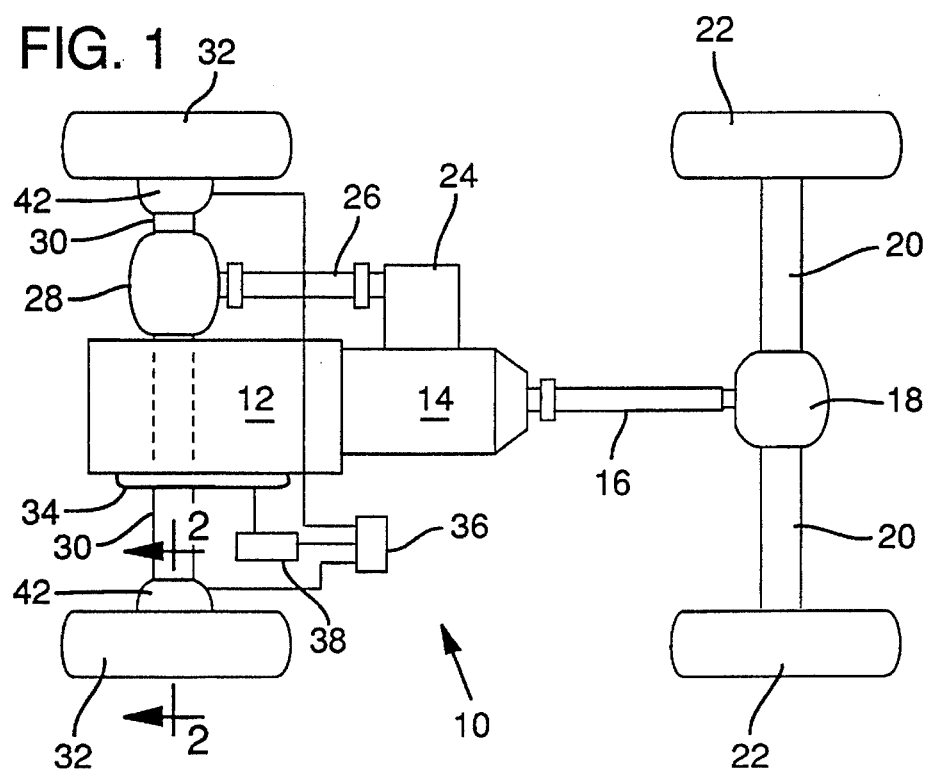
FIG. 1 is a schematic view of a four wheel drive vehicle incorporating the pulse actuated clutch of the present invention.

Refer now to FIG. 1 of the drawings which schematically illustrates a vehicle 10. The vehicle 10 may be driven in two wheel or four wheel drive mode. The vehicle 10 has an engine 12 coupled to a transmission 14. A rear drive shaft 16 extending from the transmission 14 is connected to a rear differential 18. Rear axles 20 extend from the differential 18 to provide rotative power to the rear wheels 22. The transmission 14 includes a transfer case 24. A front drive shaft 26 extending from the transfer case 24 is connected to a front differential 28. Front axles 30 extend from the front differential to provide rotative power to the front wheels 32. The transfer case 24 includes conventional shift mechanism to either provide rotative power to the front drive shaft 26 for four wheel drive mode or not to provide rotative power to the front drive shaft for two wheel drive mode.

The engine 12 has an intake manifold 34 as a source for negative air pressure for the operation of the pulse actuated clutch mechanism which will be later described. A control 36 is provided for controlling the flow of air to and from the clutch mechanisms. A reservoir 38 is coupled to the intake manifold 34.

The front wheels 32 include end hubs 280 which are later described and illustrated. The end hubs 280, which will hereafter be referred to as hubs 280, house the pulse actuated clutch mechanism of the present invention. The pulse actuated clutch mechanism couples and uncouples the wheels 32 to the front drive axles 30. When the vehicle 10 is operated in the two wheel drive mode, i.e., with the shift mechanism of the transfer case 24 in its disconnected position, the wheels 32 are uncoupled from the front drive axles 30 so that the front wheels will not propel the front axles 30 and the drive shaft 26. When the vehicle 10 is driven in four wheel drive mode, i.e., with the shift mechanism of the transfer case 24 in its connected position, the wheels 32 are then coupled to the front axles 30 so that power will be transmitted to the front wheels. Front steering knuckles 42 are provided to facilitate steering the vehicle 10

Figure 1A:
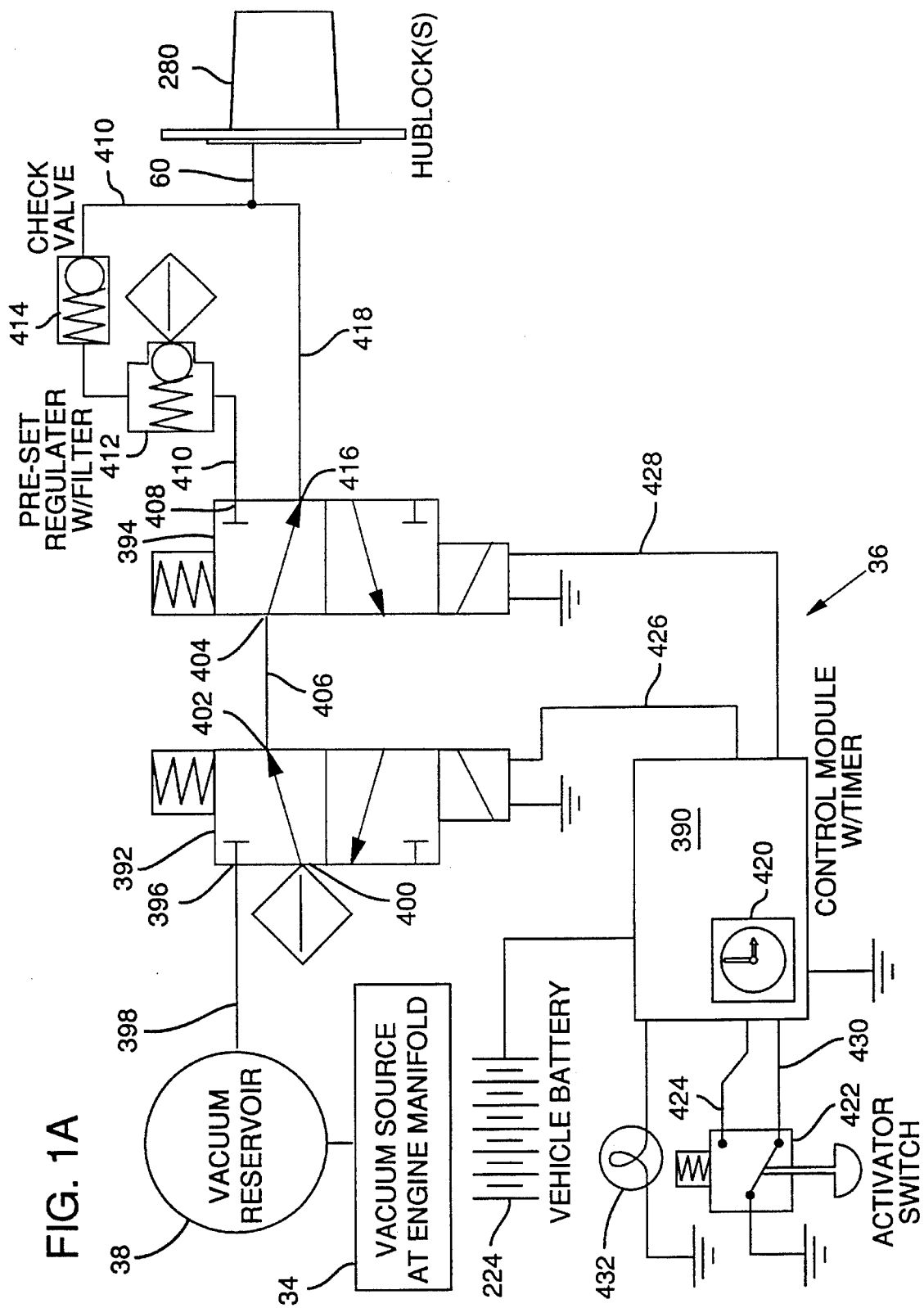
FIG. 1A is a diagrammatical view of a control for controlling the actuation of the pulse actuated clutch of the present invention.
Figure 2:
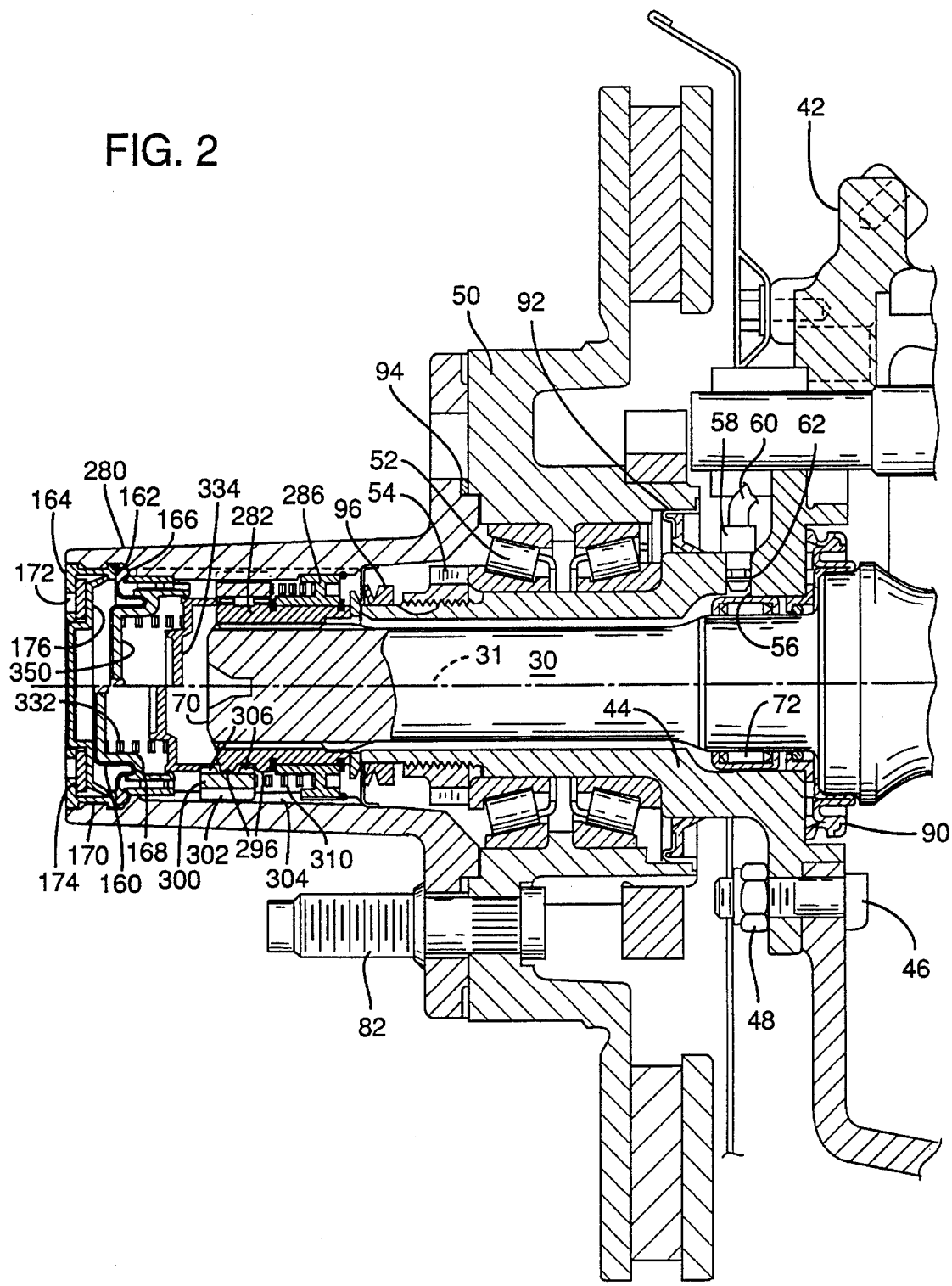
FIG. 2 is a sectional view as viewed on view lines 2—2 of FIG. 1 showing one embodiment of the pulse actuated clutch of the present invention.

Refer now to FIG. 2 of the drawings which shows in sectional view a portion of the front drive train including the front drive axle, the wheel hubs, the pulse actuated clutch mechanism of the present invention and the mounting arrangement for the front wheel. A spindle 44 is fixedly mounted to the knuckle 42 by bolts 46 and nuts 48. An integral wheel hub and brake rotor 50 is rotatably mounted on the spindle 44 by bearings 52. The integral wheel hub and brake rotor 50 is retained on the spindle by retaining nut 54. A bore 56 is provided in the spindle 44 for receiving a bushing 58 of an air line 60. The bushing 58 is sealed against leakage by an o-ring seal 62. The air line extends through the knuckle 42 and is coupled to the control 36 (see FIGS. 1 and 1A). The axle 30 is received in the spindle 44 with an end 70 of the axle 30 extending beyond the end of the spindle. The axle 30 is rotatively supported in the spindle 44 on bearing 72. An end hub 280 is mounted to the integral wheel hub and brake rotor 50 on bolts 82. The wheel 32 is mounted on the bolts 82 in a conventional manner (wheel not shown in FIG. 2).

The present invention utilizes air pressure to activate a clutch mechanism housed within the hub 280 to couple and uncouple the drive axle 30 to the hub 280 and the integral wheel hub and rotor 50 on which the wheel 32 is mounted. This requires an air tight chamber and seals are thus provided. A seal 90 seals the axle 30 to the spindle 44, a wheel hub seal 92 seals the wheel hub 50 to the spindle 44, a seal 94 seals the hub 280 to the wheel hub 50 and a seal 96 seals the hub 280 to the spindle 44. A seal flange 98 is provided in the hub 280 to facilitate sealing the hub 280 to the spindle 44 by seal 96. The end of the hub 280 is sealed by a diaphragm 160 fitted in the end of the hub 280.

Figure 3:
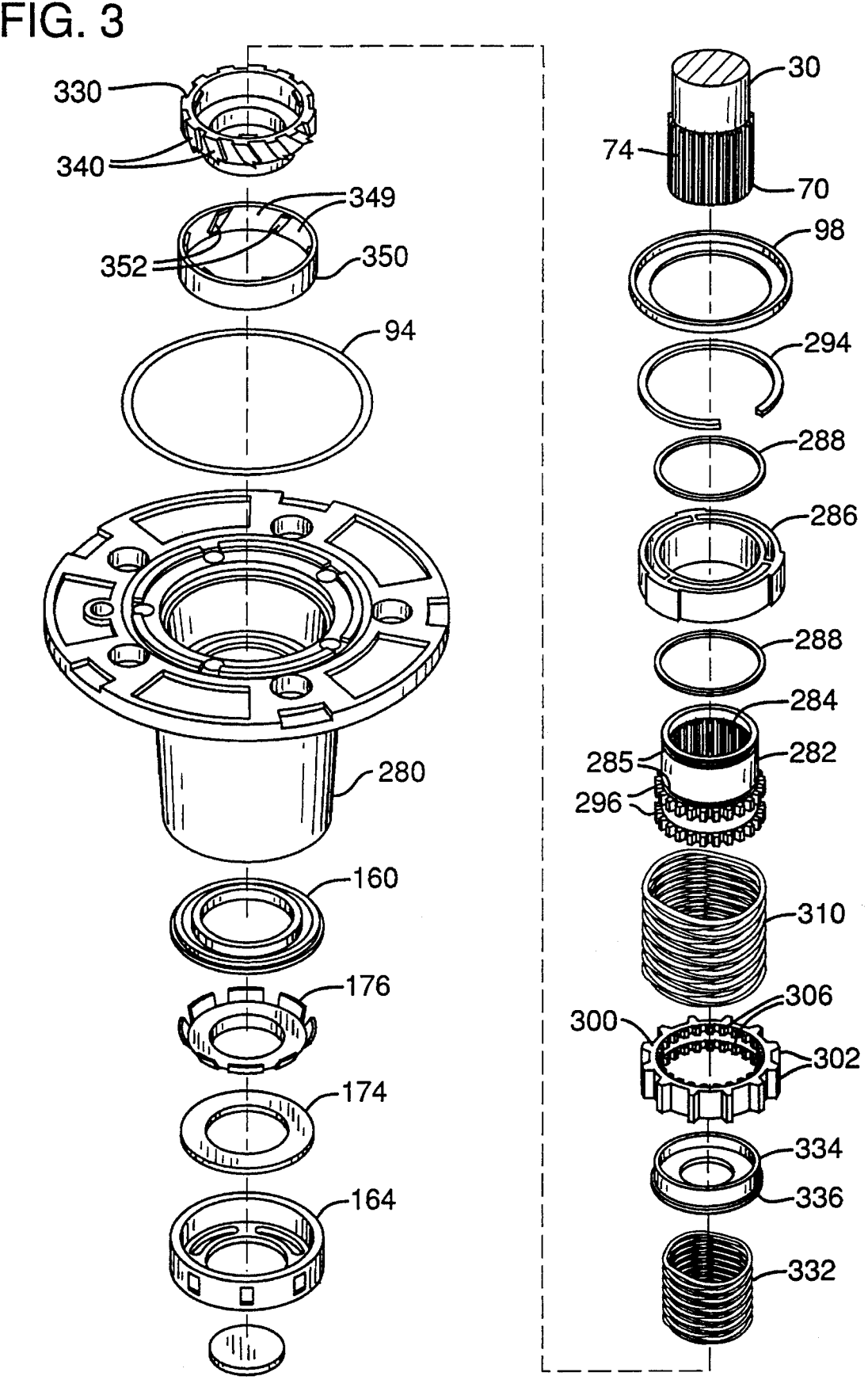
FIG. 3 is an exploded view of the wheel hub and the pulse actuated clutch of FIG. 2.
Figure 4A:
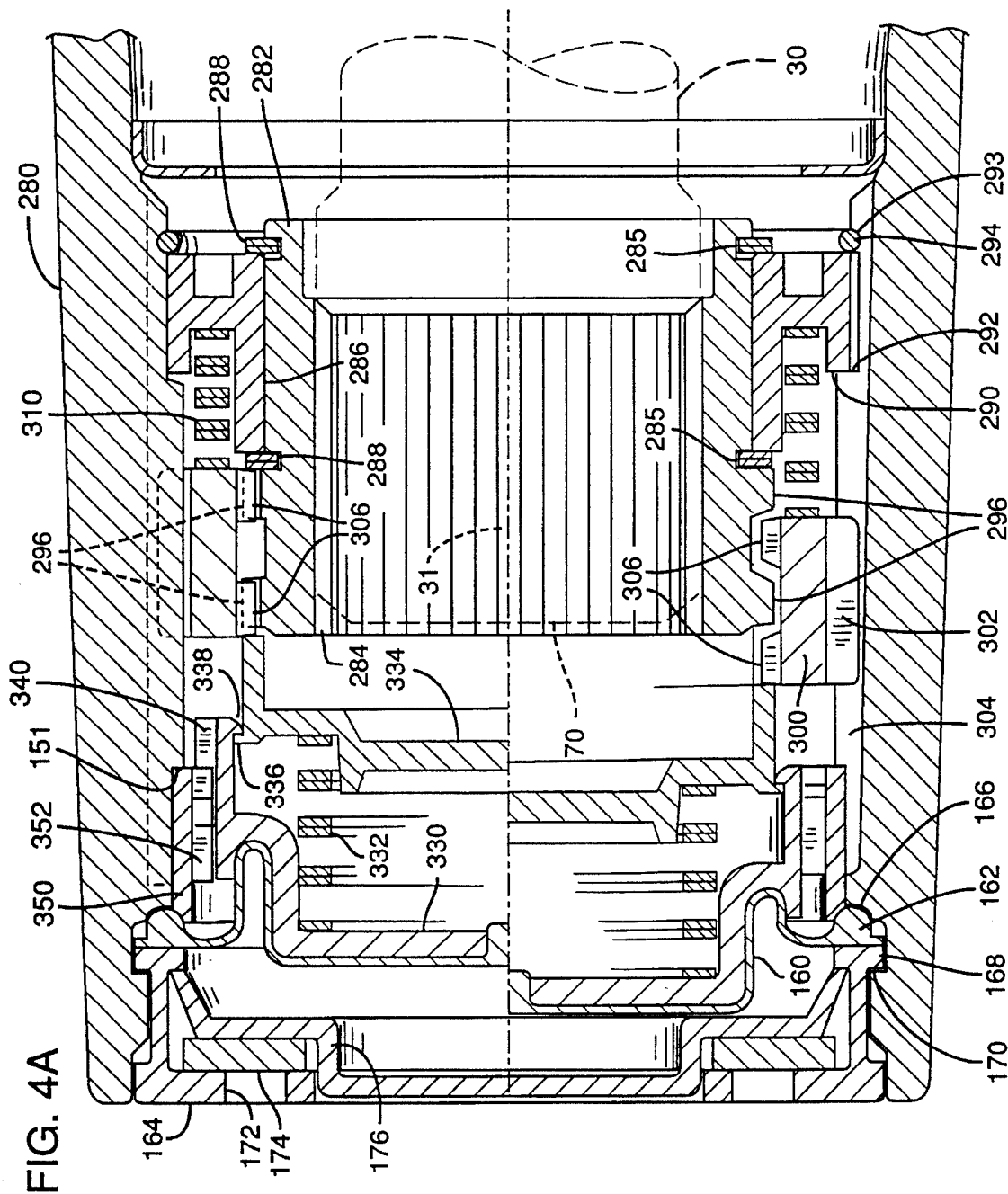
FIGS. 4A, 4B, and 4C are enlarged partial sectional views of the wheel hub end of FIG. 2.

As was previously mentioned, a clutch mechanism is housed within the hub 280 to couple and uncouple the drive axle 30 to the hub 280 and accordingly to the integral wheel hub and rotor 50. Refer also to FIGS. 3 and 4A of the drawings which provide further detail of the clutch mechanism of the present invention. FIG. 3 is an exploded view showing the relation of the hub 280 and its components and FIG. 4A is an enlarged sectional view of a portion of the hub 280. The clutch mechanism includes an inner gear 282 received on the end 70 of the axle 30. As shown in FIGS. 2 and 4A, the end 70 of the axle 30 extends into the housing of the hub 280. The end 70 has splines 74 (see FIG. 3) that mate with internal splines 284 of the inner gear 282. A bushing 286 rotatably supports the inner gear 282 and thus the end 70 of the axle 30 in the hub 280. The bushing is retained on the inner gear by retainers (fasteners), such as snap rings 288 and has an outer end 290 retained in abutment with a shoulder 292 in the hub 280 by another retainer (fastener) fitting in a groove 293, such as snap ring 294. Following assembly, the inner gear 282 in effect becomes a part of the axle 30.

A coupling member such as a clutch ring 300 surrounds the inner gear 282 and is in splined engagement with the hub 280. The clutch ring 300 has external splines 302 in sliding engagement with internal splines 304 of the hub 280. The clutch ring 300 is slidably movable along the splines 304 of the hub 280 in a first direction to a first position where it is out of engagement with the inner gear (as shown in the lower half of FIG. 4A) and in a second direction to a second position where internal splines 306 of the clutch ring 300 matingly engage external splines 296 of the inner gear 282 (as shown in the upper half of FIG. 4A). As shown in FIGS. 2, 3 and 4A, the clutch ring 300 has double rows of internal splines 306 that matingly engage double rows of external splines 296 on the inner gear 300. The clutch ring 300 is urged out of engagement with the inner gear 282 by a yieldable biasing member such as a wave spring 310. The ends of the spring 310 are in abutment with the clutch ring 300 and the bushing 286. The clutch ring 300 is urged into engagement with the inner gear 282 by the impulse actuated clutch mechanism of the present invention, which will now be described.

Figure 16:
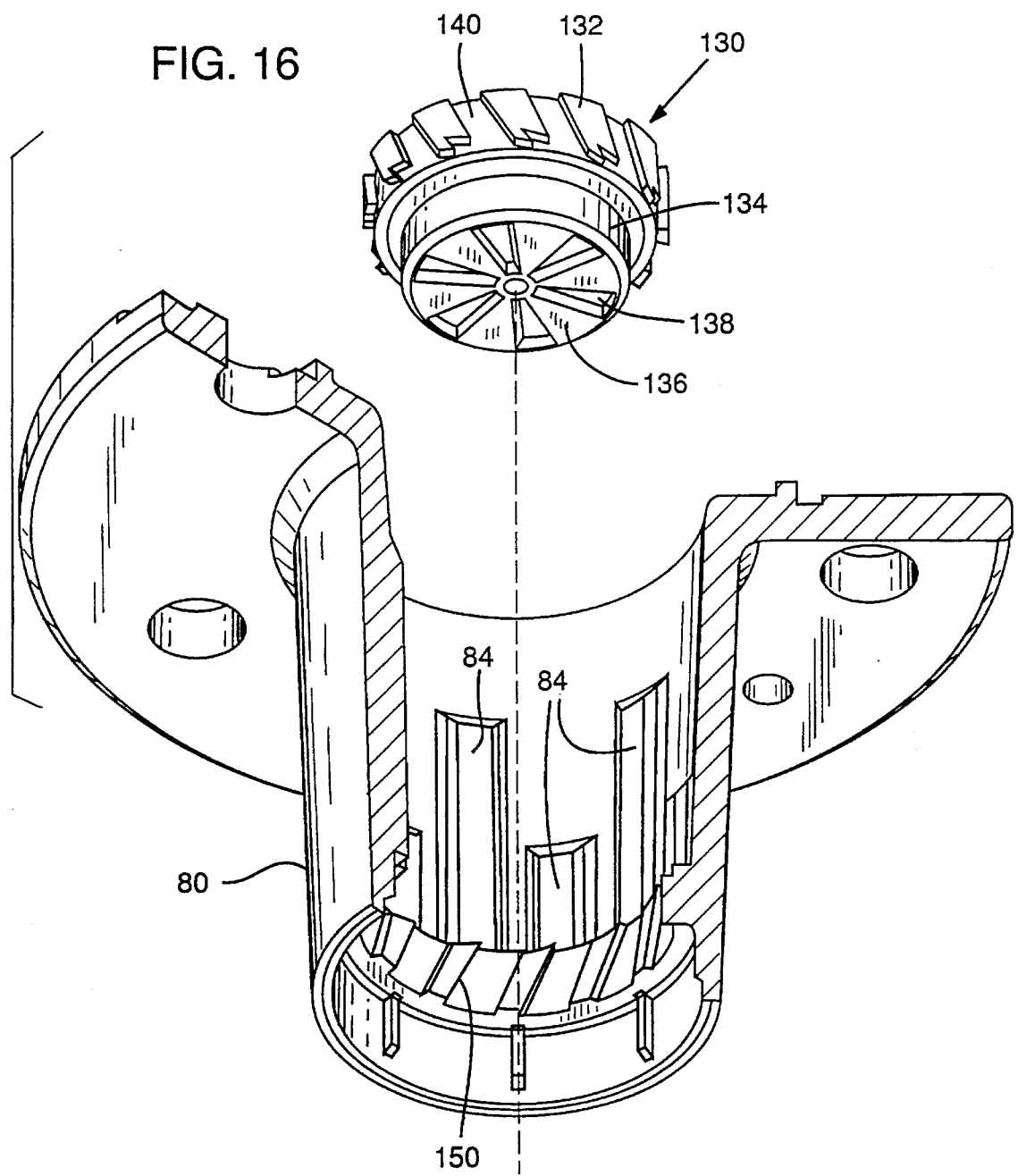
FIG. 16 is an cut-away view of an alternate hub having cam members integrally formed thereon and a piston of the pulse actuated clutch; and, FIG. 17 is a diagrammatical view of an alternate control for controlling the actuation of the pulse actuated clutch of the present invention.

Still referring to FIG. 4A in conjunction with FIGS. 2 and 3, a movable piston assembly is in abutment with the clutch ring 300 on the side opposite the spring 310. The movable piston assembly has a primary piston 330 that receives a wave spring 332 and a secondary piston 334. The secondary piston 334 is slidably movable in the primary piston 330 and is biased to move in the primary piston by the wave spring 332. An extending lip 336 (see FIG. 4A) on the secondary piston 334 engages a shoulder 338 of the primary piston 330 to limit the travel of the secondary piston urged by the spring 332. The primary piston 330 has multiple formations such as helical cams 340 (best seen in FIG. 5) in cooperative engagement with multiple formations such as helical cams 352 (best seen in FIG. 6) of an index ring 350 which will be further described and illustrated later. The index ring 350 is secured in position against a shoulder 151 of the hub 280 in a conventional manner such as by press fitting the index ring 350 in the hub 280. The index ring 350 may be provided as a separate item as illustrated in FIGS. 2, 3, 4A and 6 or the cam surfaces 352 may be formed integral with the hub 280 in the manner as illustrated in FIG. 16. A diaphragm 160 of resilient elastomeric material is loosely fitted to the piston 330. The peripheral edge 162 of the diaphragm 160 is secured between an end cap 164 fitted to the end of the hub 280 and a formed shoulder 166 of the hub 280. The diaphragm 160, as previously mentioned seals the end of the hub 280. The end cap 164 is secured to the end of the hub 280 by formed latches 168 of the cap engaging raised detents 170 of the hub 280. The end cap 164 has apertures 172 to permit entry and exit of air into the cavity between the end cap 164 and the diaphragm 160. A filter 174 covers the apertures 172 and is held in position by retainer 176. The wheel hub and rotor 50, the end hub 280, the axle 30, the inner gear 282, the clutch ring 300, the piston 330 and the index ring 350 all have a common axis of rotation designated by the numeral 31.

Refer to FIG. 3 of the drawings. The inner gear 282 has inner splines 284 that will mate with the external splines 74 on the end 70 of the axle 30. Two rows of external splines 296 formed on the inner gear 282 will mate with the two rows of internal splines 306 of the clutch ring 300. Grooves 285 are provided on the inner gear 282 for receiving the snap rings 288. The clutch ring 300 has external splines 302 that will slidingly engage the splines 304 of the hub 280.

Figure 5:
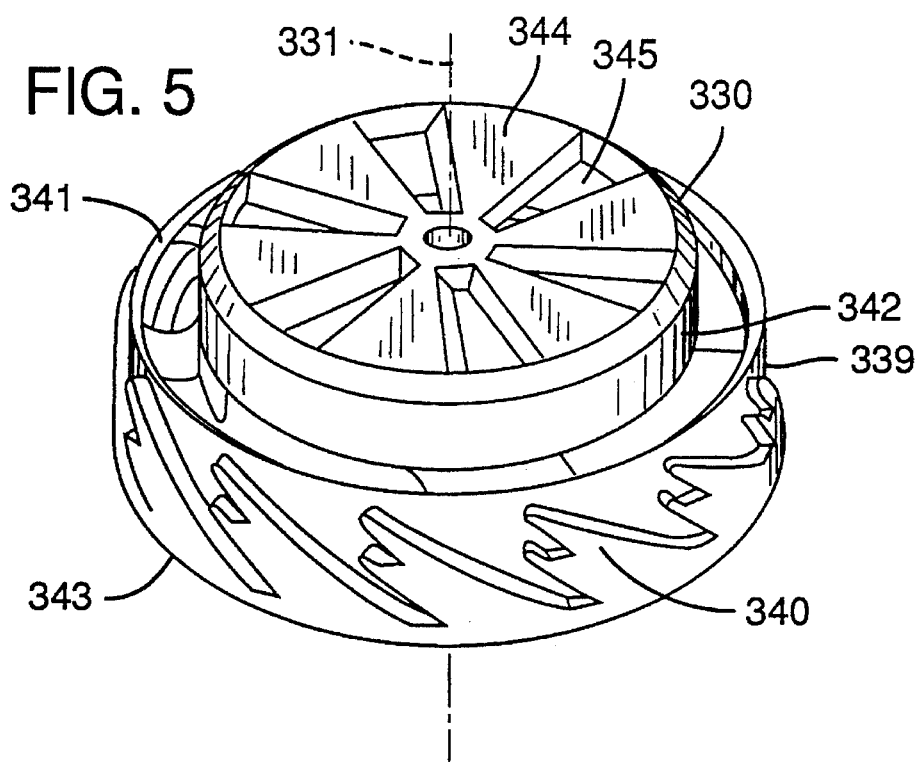
FIG. 5 is a view of a primary piston of the pulse actuated clutch of the present invention.
Figure 7:
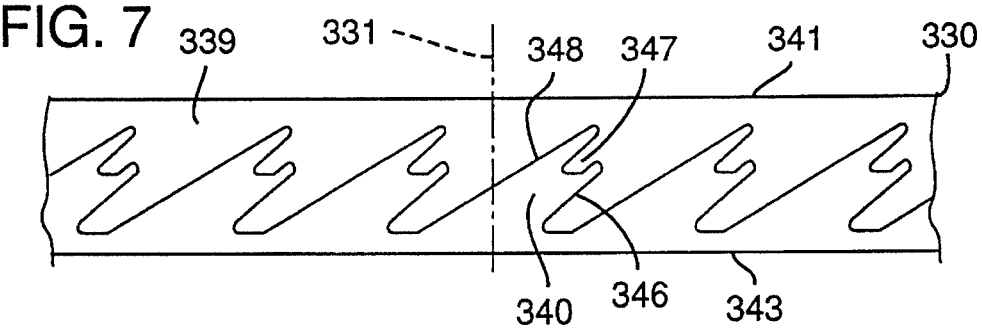
FIG. 7 is a flattened view of the cam members of the primary piston of FIG. 5.

The piston 330, which is further illustrated in FIG. 5 is a shaped member that has two cylindrical portions of differing diameters that have a common longitudinal axis 331. The cylindrical portion having the smaller diameter will be referred to as the cup 342. The cup 342 has an end 344 and apertures 345 are formed in the end 344. The larger cylindrical portion will be referred to as the cam section 339. Multiple helical cam members 340 are formed and positioned in a spaced relation on the periphery of the cylindrical cam section 339 between the cylindrical ends 341 and 343. The cams 340 are positioned such that the edges of the cams 340 are at an angle to the longitudinal axis 331 and to the cylindrical ends 341 and 343 of the cam section 339. As seen in FIG. 7, which show the cam members in flattened detail, the cam members 340 have a leading edge 346, a formed notch 347 and a trailing edge 348. As shown in FIGS. 5 and 7, the leading edge 346 and the trailing edge 348 are inclined at an angle with respect to the axis 331 and the cylindrical ends 341 and 343. The leading edge 346 and the notch 347 in combination define a first step and the trailing edge 348 and the notch 347 in combination define a second step.

Figure 6:
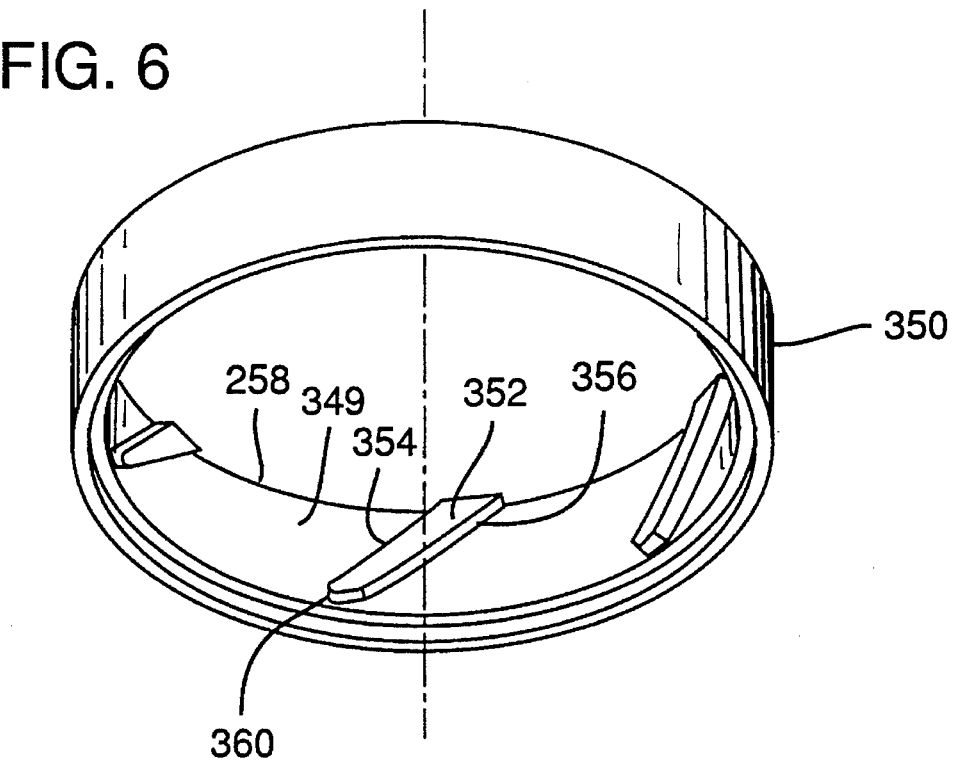
FIG. 6 is a view of an index ring of the pulse actuated clutch of the present invention.
Figure 8:
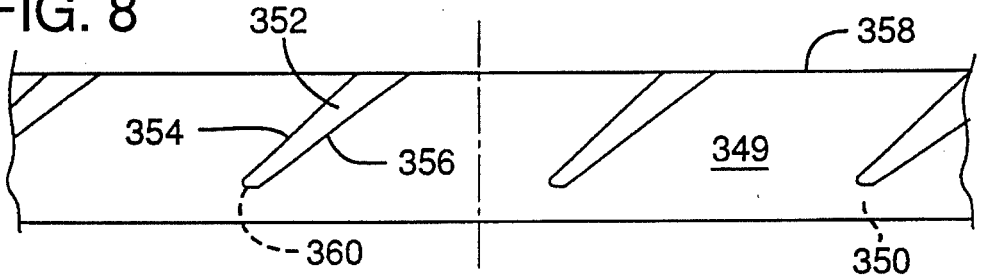
FIG. 8 is a flattened view of the cams of the index ring of FIG. 6.

The index ring 350 as best seen in FIGS. 3 and 6 is a ring shaped cylindrical member having raised cam members 352 on its interior surface 349. Refer also to FIG. 8 which shows the cams 352 in flattened detail. As shown, the cams 352 have a leading edge 354 and a trailing edge 356 extending from end 358 of the ring 350 with the leading edge and the trailing edge cooperatively forming an end 360 on the cam member 352.

Refer once again to FIGS. 2 and 4A. The clutch ring 300 is movable to a first position to be out of engagement with the inner gear 282 as shown in the lower half of FIGS. 2 and 4A and to a second position where the clutch ring 300 is in engagement with the inner gear 282 as shown in the upper half of FIGS. 2 and 4A. The clutch ring 300 moved to the first position (out of engagement with the inner gear 282)

provides for independent rotation of the wheel 32 and the axle 30. The clutch ring 300 moved to the second position (into engagement with the inner gear 282) locks the rotation of the wheel 32 to the rotation of the axle 30 to provide unity of rotation.

Referring again to FIG. 4A, the clutch ring 300 is urged to move out of engagement (the first position) with the inner gear by the return spring 310. The return spring 310 is captive between the clutch ring 300 and the bushing 286 and applies a biasing force against the clutch ring to urge it out of engagement. The lower half of FIG. 4A shows the clutch ring 300 out of engagement with the inner gear 282. This as previously mentioned, permits independent rotation of the wheel 32 and the axle 30. The clutch ring 300 is forced to move into engagement (the second position) by movement of the piston assembly toward the second position. The secondary piston 334 is in abutment with the clutch ring 300 on the side opposite the return spring 310. A selectively controlled pulse of negative air pressure, that is, a partial vacuum is created within the defined air tight chamber provided by the sealing members previously described. Air is withdrawn (evacuated) from the chamber which applies a force to the diaphragm 160. The diaphragm 160 fitted to the primary piston 330 forces the piston assembly to move toward the second position. The secondary piston 334 of the piston assembly is in abutment with the clutch ring 300 and movement of the piston assembly urges the clutch ring 300 to move into engagement with the inner gear 282. The upper half of FIG. 4A shows the piston assembly and the clutch ring 300 moved to the second position with the double row of splines 306 of the clutch ring 300 in engagement with the double row of splines 296 on the inner gear 282.

Figure 9A:
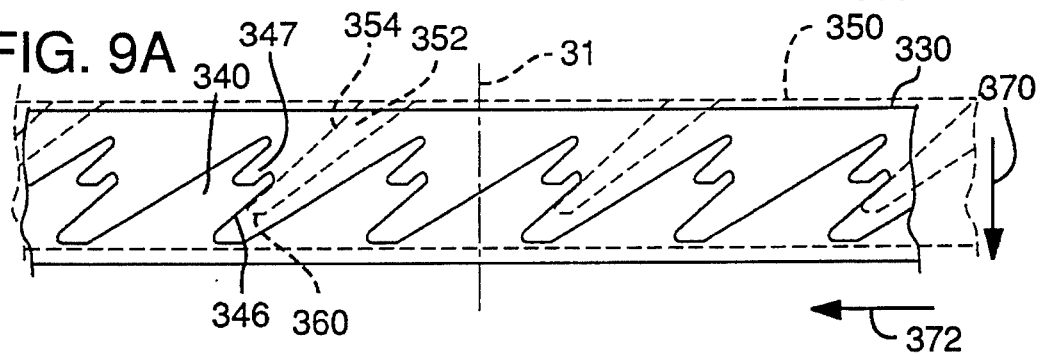
FIGS. 9A, 9B and 9C are flattened views showing the relation between cam members of the primary piston and index ring.
Figure 9B:
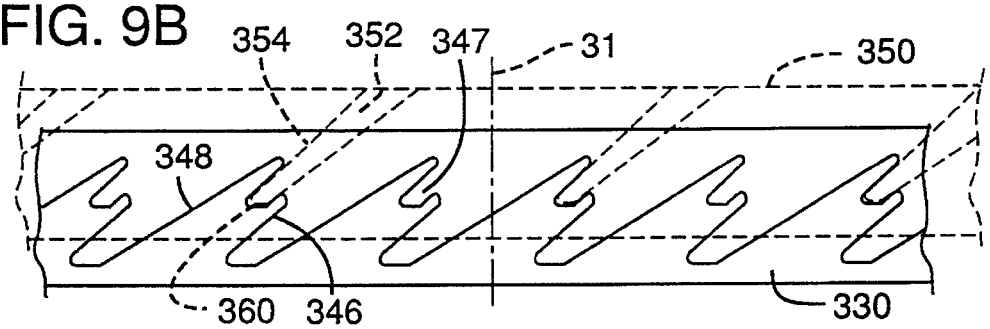
Figure 9C:
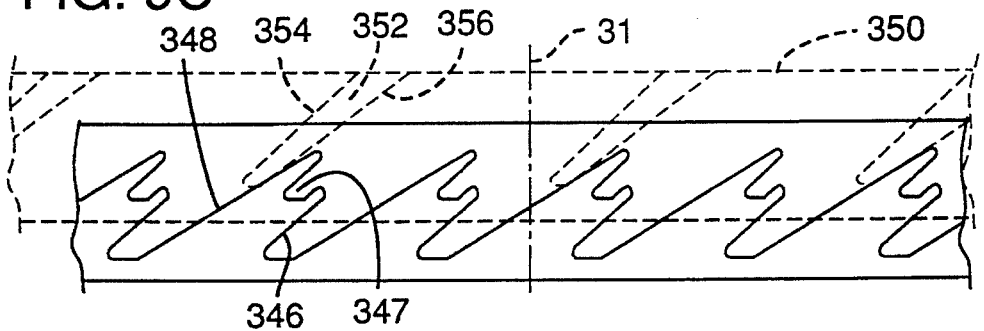

The cam members 340 of the primary piston 330 are in mesh with cam members 352 of the index ring 350 with a cam member 352 received between adjacent cam members 340. It will be appreciated that reference will be made to the index ring throughout for discussion and illustrative purposes, however the cam members 352 may be formed integral with the hub 280 as previously mentioned. FIGS. 9A, 9B and 9C show the cam members 340 and 352 in flattened detail and show the relative position of the cam members.

Consider first the condition where the clutch ring 300 is out of engagement with the inner gear 282 as shown in the lower half of FIG. 4A. Pressure is equalized on both sides of the diaphragm 160 and the return spring 310 maintains the clutch ring 300 and the piston assembly in the first position, that is the clutch ring 300 and the inner gear 282 are out of engagement. The position of the cam members 340 and 352 are as illustrated in FIG. 9A.

Differential air pressure is utilized to affect movement of the piston assembly and the clutch ring 300 from the out of engagement position (first position) to the engaged position (second position). In this embodiment, negative air pressure is utilized. Air is withdrawn (evacuated) from the defined chamber which applies a force against the diaphragm 160. As air is withdrawn, the differential air pressure will cause the diaphragm 160 to grip the cup portion 342 of the primary piston 330. The force applied to the diaphragm 160 and thus to the primary piston 330 will urge the piston assembly and the clutch ring 300 to move axially toward the second position. As the piston assembly and the clutch ring 300 move to the second position, the compression spring 310 will be compressed, the clutch ring 300 will come into engagement with the inner gear 282 and into abutment with the retainer 288. The force applied by the negative air pressure is sufficient to force further movement of the primary piston 330 to partially compress the spring 332. As the primary piston 330 is moved axially along the rotational axis 31 as indicated by arrow 370 in FIG. 9A, the leading edge 346 of the cam member 340 will be in sliding engagement with the leading edge 354 of the cam member 352. During movement of the primary piston 330 in the direction indicated by arrow 370, the cam members 340 and 352 will cooperatively rotate the primary piston 330 within the hub 280 about the rotation axis 31 as indicated by arrow 372. The rotation of the piston 330 will twist the diaphragm 160 gripping the cup 342 of the piston to provide a resistive biasing torque on the piston 330. The diaphragm 160 can be considered to be a loadable biasing member, that is it does not provide any rotational biasing force until it is twisted. As the primary piston 330 continues to move in the direction indicated by arrow 370, the end 360 of the cam member 352 will clear the leading edge 346 of the cam member 340. The biasing force provided by the twisted diaphragm 160 will cause the primary piston 330 to rotate counter to the direction indicated by arrow 372 which will place the end 360 of the cam member 352 in the notch 347 of the cam member 340. The negative air pressure in the defined chamber is released and the partially compressed spring 332 will urge the primary piston to move toward the first position to fully seat the end 360 in the notch 347 as shown in FIG. 9B. The first pulse of negative air pressure is selected to have a magnitude sufficient to only move the primary piston 330 a sufficient distance to have the end 360 of the cam member 352 seated in the notch 347 of the cam member 340. The end 360 seated in the notch 347 prevents the springs 310 and 332 from moving the clutch ring 300 and the piston assembly to the out of engagement position (first position). The clutch mechanism is thus in a latched position when the end 360 is seated in the notch 347. Referring to the upper half of FIG. 4A, the clutch mechanism in the latched condition has the clutch ring 300 moved into engagement with the inner gear 282. The condition of the upper half of FIG. 4A is when the splines of the inner gear 282 and the clutch ring 300 are in alignment.

Frequently, the splines of the clutch ring 300 and the inner gear 282 are out of alignment and when the clutch ring is urged to move into engagement, the splines 306 of the clutch ring abut the splines 296 of the inner gear. This condition is illustrated in the upper half of FIG. 4B. As shown, the primary piston 330 has been moved by the application of negative air pressure and is in the latched condition. The clutch ring 300 is prevented from moving into engagement, since the splines 306 are not aligned with the splines 296 of the inner gear 282 and thus the secondary piston 334 which is in abutment with the clutch ring is prevented from moving. As the primary piston 330 moved, the wave spring 332 in abutment with the primary piston 330 and the secondary piston 334 is compressed. Upon rotation of the hub and axle relative to one another, the splines 306 of the clutch ring 300 and the splines 296 of the inner gear 282 become aligned and the clutch ring is forced into engagement by the force applied by the compressed spring 332. When the clutch ring 300 becomes engaged with the inner gear 282, the clutch ring and piston assembly will be positioned as shown in FIG. 4A.

The clutch mechanism is unlatched to permit movement of the clutch ring 300 toward the first position and out of engagement with the inner gear 282 by applying a second pulse of negative air pressure to the defined chamber. The second pulse of negative air pressure is greater in magnitude than the first pulse. As shown in the upper half of FIG. 4C, the second pulse of pressure moves the primary piston toward the clutch ring to further compress the wave spring 332 between the primary piston 330 and the secondary piston 334. As the primary piston 330 is moved, the leading edge 354 of the cam member 352 will be in sliding contact with the side of the notch 347 to once again rotate the primary piston 330 to twist the diaphragm 160. The primary piston 330 is moved to the position shown in FIG. 4C which moves the cam member 340 clear of the end 360 of cam member 352. The diaphragm 160 will rotate the primary piston 330 sufficiently to move the tip of the notch 347 adjacent the trailing edge 348 past the end 360 of cam member 352. The air pressure is released and the return springs 332 and 310 will force the piston assembly and the clutch ring toward the first position as indicated by arrow 380 in the lower half of FIG. 4C. The release of the pressure releases the grip that the diaphragm 160 has on the primary piston 330 and as the primary piston 330 is moved toward the first position, the cam members 340 and 352 will be in sliding engagement as shown in FIG. 9C.

Figure 4B:
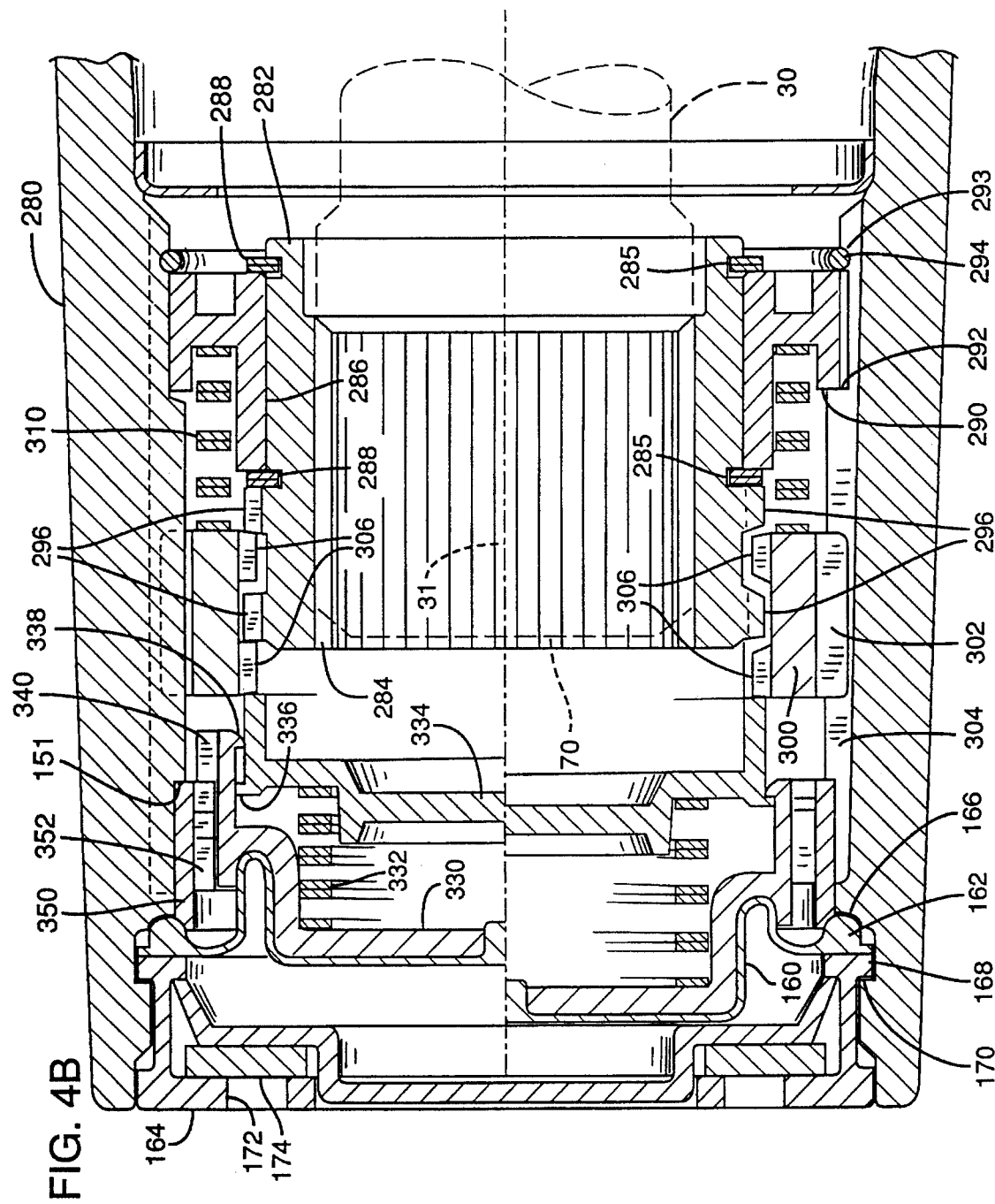
Figure 4C:
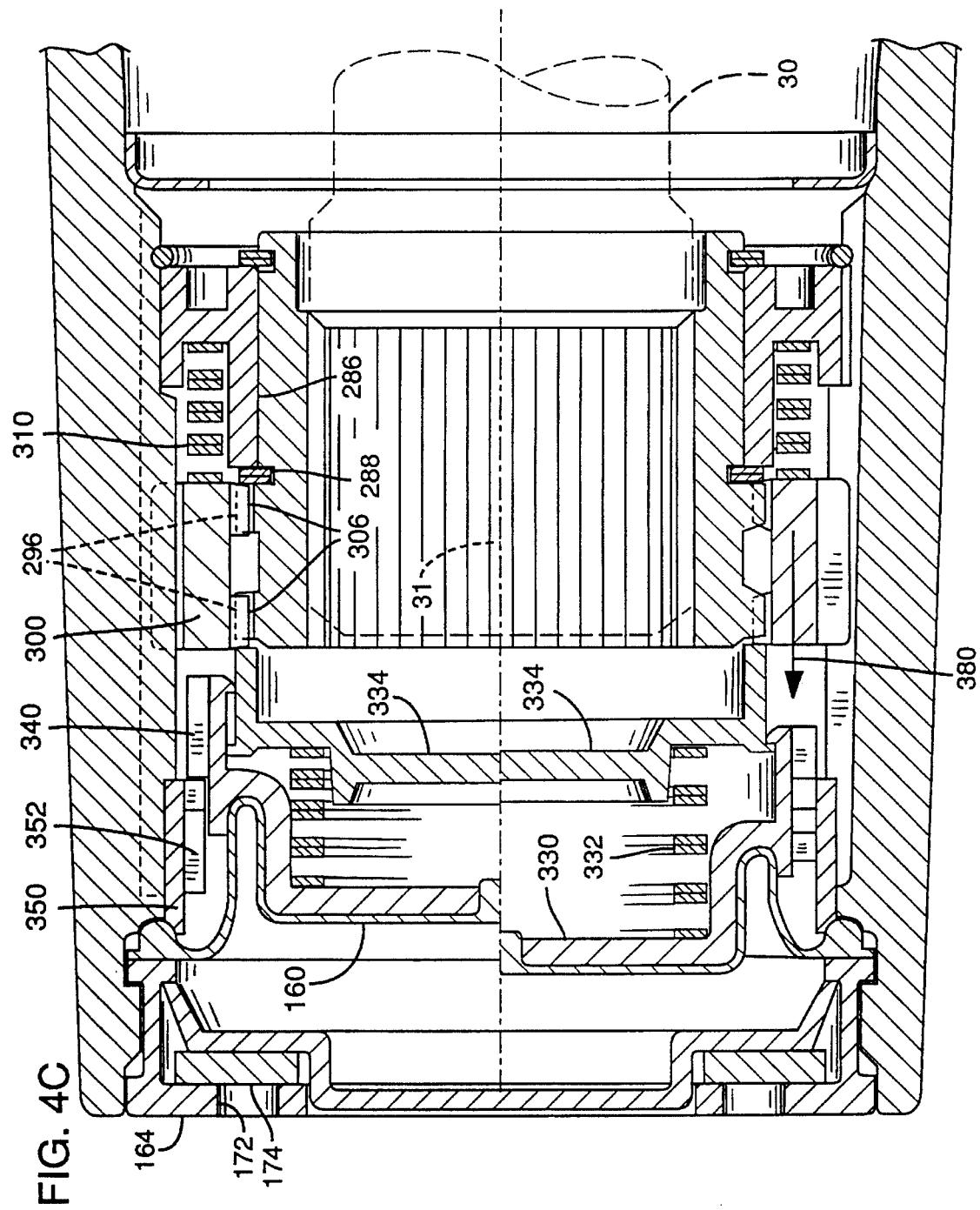

Refer again to the upper half of FIG. 4B where the splines of the clutch ring 300 and the inner gear 282 are in abutment. The first pulse of negative air pressure is selected to have a magnitude to force axial movement of the primary piston 330 adequately to latch the clutch mechanism in the engaged position. That is, the primary piston 330 will be forced to move axially toward the inner gear 282 and will be moved far enough for the leading edge 346 of the cam member 340 to clear the end 360 of the cam member 352 (see FIGS. 9A and 9B). The spring 332, which opposes the force applied by the negative air pressure, will be compressed in the process since the secondary piston 334 in abutment with the clutch ring 300 is prevented from movement. The spring 332 as it is compressed, provides a linearly increasing counter force to oppose the force provided by the negative air pressure. The spring 332 is selected to provide a counter force upon compression of the spring 332 to a determined distance to equalize the force applied by the first pulse of negative air pressure. The spring 332 will thus limit the movement of the primary piston relative to the secondary piston to a predetermined distance. As by way of example and still referring to the condition where the splines of the clutch ring 300 are in abutment with the splines of the inner gear 282, a first pulse of negative air pressure on the order of eight inches of mercury will move the primary piston 330 axially relative to the index ring 350 and thus relative to the secondary piston 334 on the order of 0.170 inches. In the example illustrated in the upper half of FIG. 4B, the primary piston 330 will be moved 0.170 inches upon the application of a first pulse of negative air pressure of eight inches of mercury. The 0.170 inch movement of the primary piston will move the tip of the leading edge 346 of the cam member 340 beyond the end 360 of the cam member 352 permitting the primary piston to rotate to receive the end 360 in the notch 347. Upon release of the first pulse of negative air pressure, the compressed spring 332 will force the primary piston toward the first position to fully seat the end 360 in the notch 347. When the axle 30 and the hub 280 are rotated relative to each other, the splines 296, 306 of the inner gear 282 and the clutch ring 300 will become aligned and the compressed spring 332 will force the clutch ring to snap into engagement with the inner gear 282. The primary piston 330 is prevented from moving toward the first position by the end 360 seated in the notch 347. The compressed spring 332 will force the secondary piston 334 to move axially to the second position and thus move the clutch ring 300 to move axially to the second position to become engaged with the inner gear 282 as illustrated in the upper half of FIG. 4A.

The primary piston 330 is moved axially relative to the index ring 350 and since the secondary piston 334 is prevented from further movement also moves relative to the secondary piston 334 a greater distance to unlatch the clutch mechanism and in this embodiment the distance is on the order of 0.210 inches. Referring to the upper half of FIG. 4A, the clutch ring 300 is engaged with the inner gear 282 and the primary piston 330 is in a latched position, that is the end 360 of the cam member 352 is seated in the notch 347 of the cam member 340. A second pulse of negative air pressure is applied and in this embodiment, the second pulse has a minimum magnitude on the order of ten inches of mercury. The application of the second pulse will force the primary piston 330 to move axially toward the inner gear 282 and thus move relative to the index ring 350 and the secondary piston 334. The secondary piston 334 is prevented from moving by the clutch ring 300 in abutment with retainer 288. The second pulse of negative air pressure will force the primary piston 330 to move sufficiently for the end 360 of the cam member 352 to clear the tip of the notch 347 adjacent the trailing edge 348 of the cam member 340 (see FIGS. 9A,B,C). The twisted diaphragm 160 will rotate the primary piston 330 and upon release of the second pulse of negative air pressure, the compressed springs 332 and 310 in combination will force the primary piston 330 toward the first position and move the clutch ring 300 and the piston assembly to the first position to thus move the clutch ring 300 out of engagement with the inner gear 282.

In the situation where the splines of the clutch ring 300 and the inner gear 282 are aligned, the application of the first pulse of negative air pressure will initially move the piston assembly (i.e., the primary piston 330, spring 332 and secondary piston 334) and the clutch ring 300 axially to the second position with the clutch ring 300 engaging the inner gear 282. In this embodiment, the initial movement of the clutch ring 300 to engage the inner gear 282 and come into abutment with the retainer 288 is on the order of 0.125 inches. This initial movement is not sufficient for the end 360 to clear the end of the notch 347 adjacent the leading edge 346. The first pulse of negative air pressure will continue to move the primary piston 330 beyond the initial movement an additional 0.170 inches, again compressing the spring 332. The additional 0.170 inch movement of the primary piston 330 moves the end of the notch 347 adjacent the leading edge 346 clear of the end 360 and the piston will be rotated to receive the end 360 in the notch 347. The combined movements of the initial movement to engagement (0.125) plus the additional movement (0.170) will not move the primary piston far enough for the end 360 to clear the end of the notch 347 adjacent the trailing edge 348 and therefore as the piston is rotated, the end 360 will still be received in the notch 347. The first pulse of negative air pressure is released and the end 360 becomes fully seated in the notch 347 to latch the clutch mechanism.

Refer now to FIG. 1A of the drawings which diagrammatically illustrates the control 36 for controlling the application and release of the first and second pulse of negative air pressure to and from the hubs 280. A control module 390 is provided to control two three-way, two-position, solenoid-actuated, spring-return pneumatic valves 392 and 394. A port 396 of valve 392 is connected to the reservoir 38 via air line 398. Port 400 of valve 392 is vented to the atmosphere. Port 402 of valve 392 is connected to port 404 of valve 394 via air line 406. Port 408 of valve 394 is connected to a regulator 412 via an air line 410. The regulator 412 is connected to air line 60 of the hub 280 via a check valve 414. Port 416 of valve 394 is connected to the air line 60 via air line 418. The control module 390 controls the operation of the valves 392 and 394 by energizing and de-energizing the circuits to the valves. A timer 420 is provided in the control module 390 to control the length of time a circuit is to be energized. An activator switch 422 is provided to enable the control module 390. FIG. 1A shows the condition where the circuits are not energized and the valves 392 and 394 are in their normal position. To engage the clutch ring 300 with the inner gear 282, the switch 422 is toggled to complete the circuit to the control module 390 via line 424. This will set the timer 420 and energize the valves 392 and 394 via lines 426 and 428. Valve 392 will connect port 396 to port 402 and valve 394 will connect port 404 to port 408. Air will thus be withdrawn from the defined chamber of the hub 280. The regulator 412 is set so that a partial vacuum of a magnitude of about eight inches of mercury will be created in the defined cavity of the hub 280. This will latch the clutch mechanism as previously described. After the timer cycles, the valves 392 and 394 will be de-energized to return to their normal state and the defined cavity of the hub 280 will be vented to the atmosphere via lines 60, 418 and through the valves 392 and 394. To move the clutch ring 300 out of engagement with the inner gear 282, the switch 422 is toggled to complete the circuit to the control module 390 via line 430. This will set the timer 420 for the proper interval for disengaging and will energize the valve 392 via line 426. Valve 394 is not energized and remains in its normal position. Port 396 is once again connected to port 402 of valve 392 and air is withdrawn from the defined cavity of the hub 280 via line 418 and 60. After the timer cycles, the valve 392 is de-energized and the cavity is once more vented to the atmosphere. The control module 390 and the valves 392 and 394 are powered by the vehicle battery 224. An indicator light 432 is provided to indicate that the hubs have been engaged.

An alternate embodiment of the pulse actuated clutch mechanism will now be described.

The front wheels 32 include end hubs 80 which are later described and illustrated. The end hubs 80, which will hereafter be referred to as hubs 80, house the impulse actuated clutch mechanism of the present invention. The impulse actuated clutch mechanism couples and uncouples the wheels 32 to the front drive axles 30. When the vehicle 10 is operated in the two wheel drive mode, i.e., with the shift mechanism of the transfer case 24 in its disconnected position, the wheels 32 are uncoupled from the front drive axles 30 so that the front wheels will not propel the front axles 30 and the drive shaft 26. When the vehicle 10 is driven in four wheel drive mode, i.e., with the shift mechanism of the transfer case 24 in its connected position, the wheels 32 are then coupled to the front axles 30 so that power will be transmitted to the front wheels. Front steering knuckles 42 are provided to facilitate steering the vehicle 10.

Figure 10:
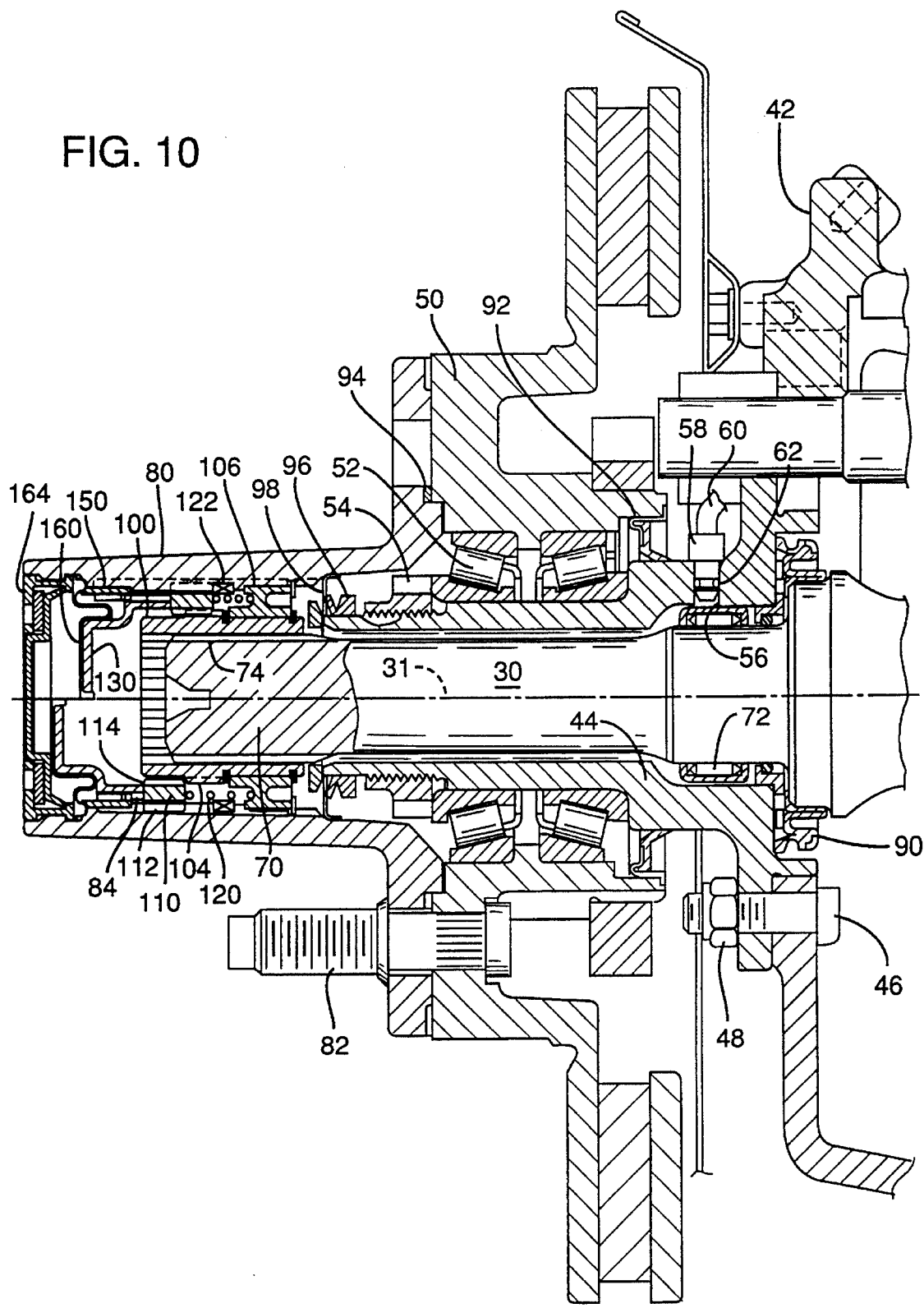
FIG. 10 is a sectional view as viewed on view lines 2—2 of FIG. 1 showing another embodiment of the pulse actuated clutch of the present invention.

Refer now to FIG. 10 of the drawings which shows in sectional view a portion of the front drive train including the front drive axle, the wheel hubs, the impulse actuated clutch mechanism of the present invention and the mounting arrangement for the front wheel. A spindle 44 is fixedly mounted to the knuckle 42 by bolts 46 and nuts 48. An integral wheel hub and brake rotor 50 is rotatably mounted on the spindle 44 by bearings 52. The integral wheel hub and brake rotor 50 is retained on the spindle by retaining nut 54. A bore 56 is provided in the spindle 44 for receiving a bushing 58 of an air line 60. The bushing 58 is sealed against leakage by an o-ring seal 62. The air line extends through the knuckle 42 and is coupled to the control 36 (see FIG. 1). The axle 30 is received in the spindle 44 with an end 70 of the axle 30 extending beyond the end of the spindle. The axle 30 is rotatively supported in the spindle 44 on bearing 72. An end hub 80 is mounted to the integral wheel hub and brake rotor 50 on bolts 82. The wheel 32 is mounted on the bolts 82 in a conventional manner (wheel not shown in FIG. 10).

The present invention utilizes air pressure to activate a clutch mechanism housed within the hub 80 to couple and uncouple the drive axle 30 to the hub 80 and the integral wheel hub and rotor 50 on which the wheel 32 is mounted. This requires an air tight chamber and seals are thus provided. A seal 90 seals the axle 30 to the spindle 44, a wheel hub seal 92 seals the wheel hub 50 to the spindle 44, a seal 94 seals the hub 80 to the wheel hub 50 and a seal 96 seals the hub 80 to the spindle 44. A seal flange 98 is provided in the hub 80 to facilitate sealing the hub 80 to the spindle 44 by seal 96. The end of the hub 80 is sealed by a diaphragm 160 fitted in the end of the hub 80.

Figure 12:
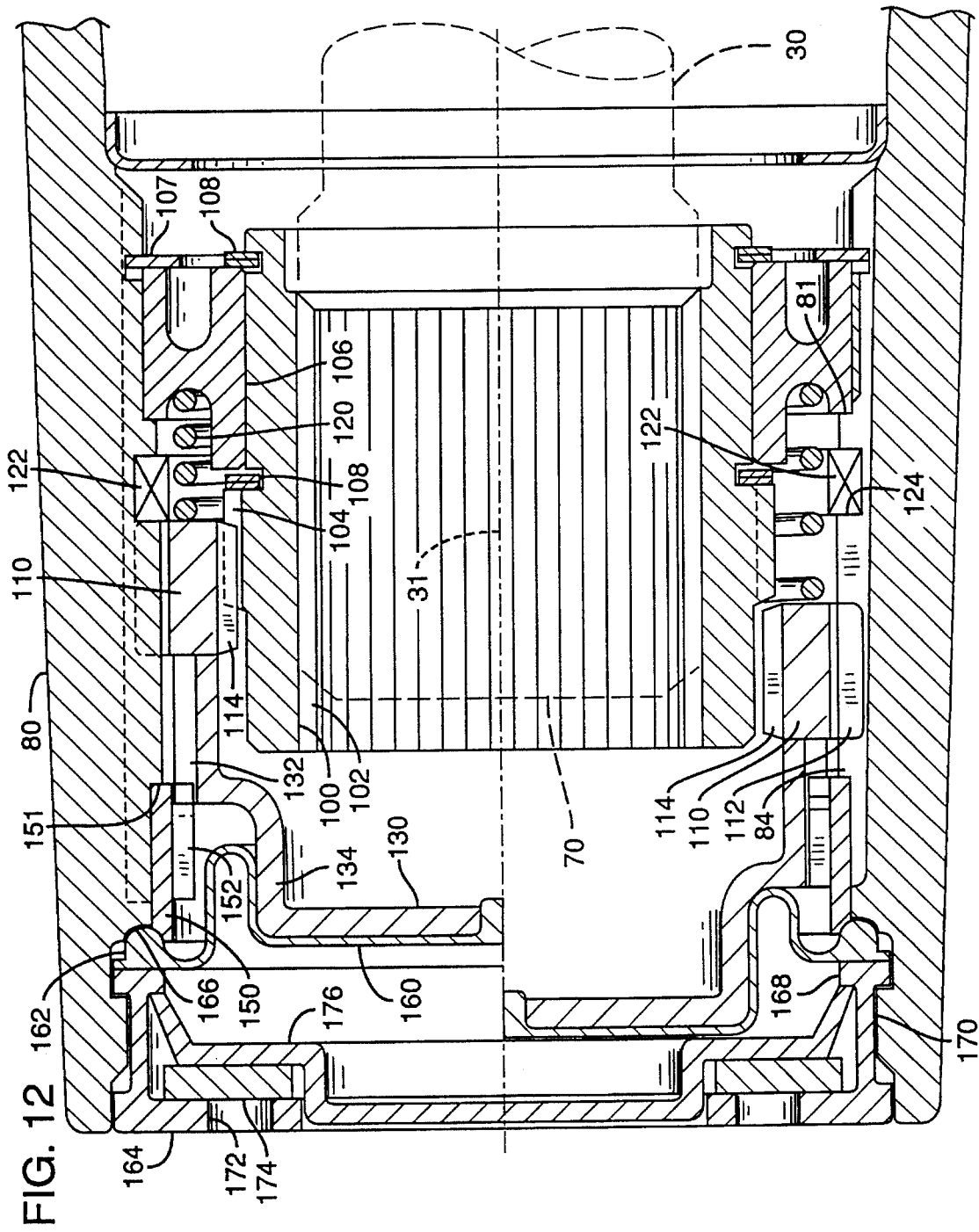
FIG. 12 is an enlarged partial sectional views of the wheel hub end of FIG. 10.
Figure 11:
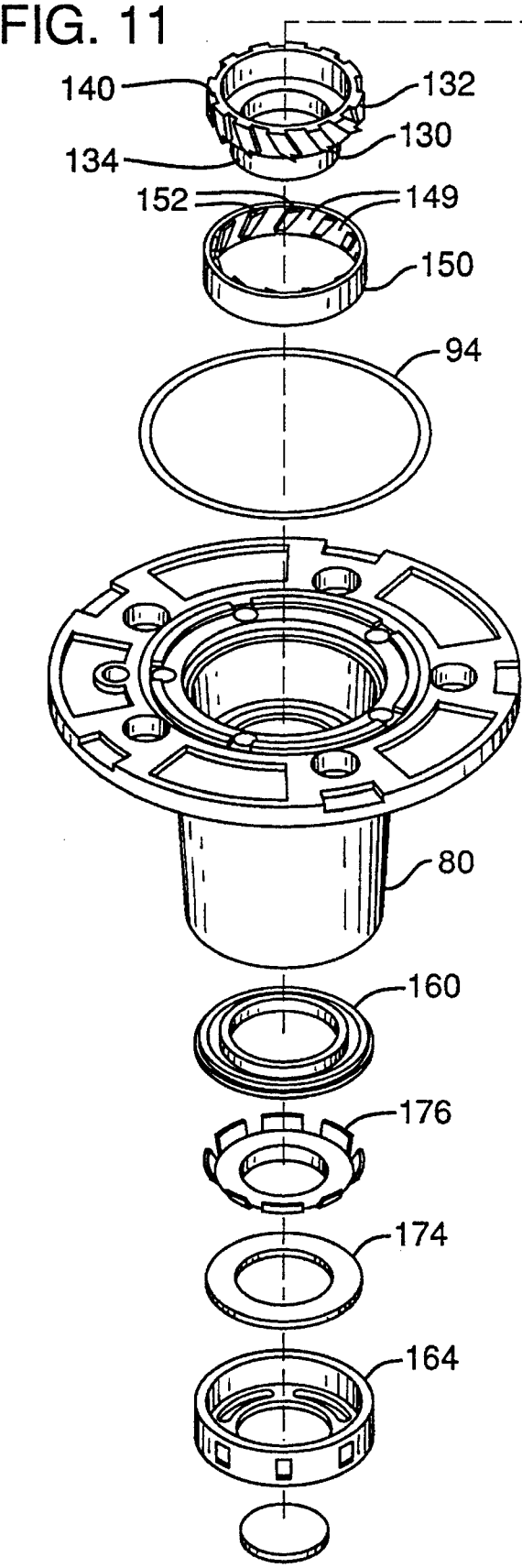
FIG. 11 is an exploded view of the wheel hub and the pulse actuated clutch of FIG. 10.
Figure 11:
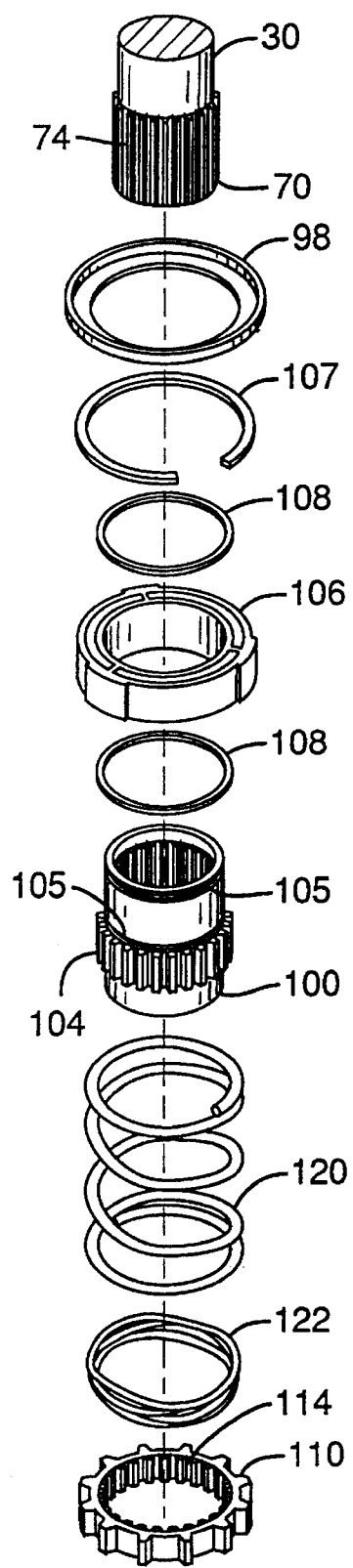

As was previously mentioned, a clutch mechanism is housed within the hub 80 to couple and uncouple the drive axle 30 to the hub 80 and accordingly to the integral wheel hub and rotor 50. Refer also to FIGS. 11 and 12 of the drawings which provide further detail of the clutch mechanism of the present invention. FIG. 11 is an exploded view showing the relation of the hub 80 and its components and FIG. 12 is an enlarged sectional view of a portion of the hub 80. The clutch mechanism includes an inner gear 100 received on the end 70 of the axle 30. As shown in FIGS. 10 and 12, the end 70 of the axle 30 extends into the housing of the hub 80. The end 70 has splines 74 that mate with internal splines 102 of the inner gear 100. A bushing 106 rotatably supports the inner gear 100 and thus the end 70 of the axle 30 in the hub 80. The bushing is retained on the inner gear by fasteners, such as snap rings 108 and is retained in abutment with a shoulder 81 in the hub 80 by another fastener, such as snap ring 107. Gear 100 is thus a permanent fixture of axle 30 following assembly.

A coupling member such as a clutch ring 110 surrounds the inner gear 100 and is in splined engagement with the hub 80. The clutch ring 110 has external splines 112 in sliding engagement with internal splines 84 of the hub 80. The clutch ring 110 is slidably movable along the splines 84 of the hub 80 in a first direction to a first position where it is out of engagement with the inner gear (as shown in the lower half of FIG. 12) and in a second direction to a second position where internal splines 114 of the clutch ring 110 matingly engage external splines 104 of the inner gear 100 (shown in the upper half of FIG. 12). The clutch ring 110 is urged out of engagement with the inner gear 100 by a yieldable biasing member such as a spring 120. The ends of the spring 120 are in abutment with the clutch ring 110 and the bushing 106. A wave spring 122 fitting in a groove 124 of the hub 80 is provided as an added (second) yieldable biasing member, the purpose of which will be later described. The clutch ring 110 is urged into engagement with the inner gear 100 by the impulse actuated mechanism of the present invention, which will now be described.

Referring to FIG. 12 in conjunction with FIGS. 10 and 11, a moveable piston 130 is in abutment with the clutch ring 110 on the side opposite the spring 120. The piston has multiple formations such as helical cams 132 in cooperative engagement with multiple formations such as helical cams 152 of an index ring 150. The index ring 150 is secured in position against a shoulder 151 of the hub 80 as by gluing. The index ring 150 may be provided as a separate item as illustrated in FIGS. 10, 11, and 12 or it may be formed integral with the hub 80 as illustrated in FIG. 16. A diaphragm 160 of resilient elastomeric material is loosely fitted to the piston 130. The peripheral edge 162 of the diaphragm 160 is secured between an end cap 164 fitted to the end of the hub 80 and a formed shoulder 166 of the hub 80. The diaphragm 160, as previously mentioned seals the end of the hub 80. The end cap 164 is secured to the end of the hub 80 by formed latches 168 of the cap engaging raised detents 170 of the hub 80. The end cap 164 has apertures 172 to permit entry and exit of air into the cavity between the end cap 164 and the diaphragm 160. A filter 174 covers the apertures 172 and is held in position by retainer 176. The wheel hub and rotor 50, the end hub 80, the axle 30, the inner gear 100, the clutch ring 110, the piston 130 and the index ring 150 all have a common axis of rotation designated by the numeral 31.

Refer to FIG. 11 of the drawings. The inner gear 100 has inner splines 102 that will mate with the external splines 74 on the end 70 of the axle 30. External splines 104 are formed on the inner gear that will mate with the internal splines 114 of the clutch ring 110. Grooves 105 are provided on the inner gear 100 for receiving the snap rings 108. The clutch ring 110 has external splines 112 that will slidingly engage the splines 84 of the hub 80. Internal splines 114 of the clutch ring 110 will mate with the external splines 104 of the inner gear 100.

Figure 13:
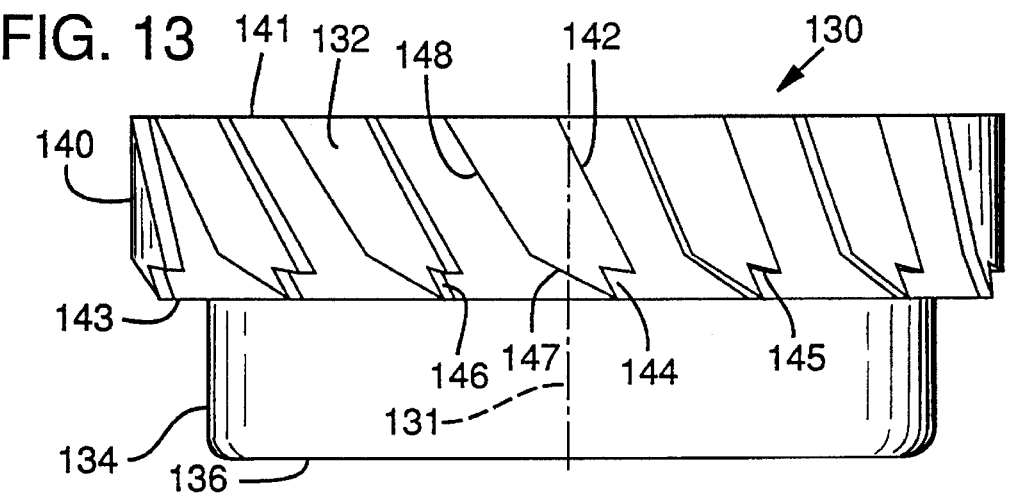
FIG. 13 is a view of an alternate piston of the pulse actuated clutch of FIG. 10.
Figure 13A:
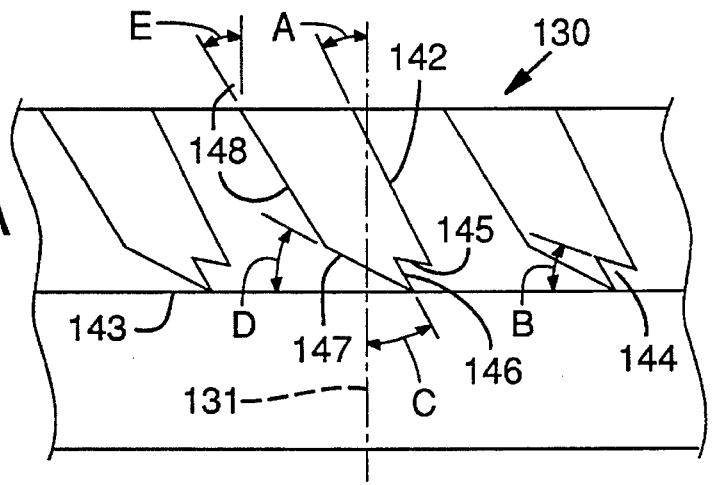
FIG. 13A is a flattened view of the cams of the piston of FIG. 13.

The piston 130, which is further illustrated in FIG. 13 is a shaped member that has two cylindrical portions of differing diameters that have a common longitudinal axis 131. The cylindrical portion having the smaller diameter will be referred to as the cup 134. The cup 134 has an end 136 (see FIG. 16) and apertures 138 are formed in the end 136. The larger cylindrical portion will be referred to as the cam section 140. Multiple helical cams 132 are formed and positioned in a spaced relation on the periphery of the cylindrical cam section 140 between the cylindrical ends 141 and 143. The cams 132 are positioned such that the edges of the cams 132 are at an angle to the longitudinal axis 131 and to the cylindrical ends 141 and 143 of the cam section 140. As seen in FIG. 13A, which show the cams in flattened detail, the cams 132 have a leading edge 142 that is at an angle A (the angle A being about 22 degrees) with respect to the axis 131. The leading edge 142 extends from the end 141 to a position near end 143 of the cam section 140 where it is joined to an edge 145 to form a first step. Edge 145 is one of the edges of a notch 144. The edge 145 is at an angle B (angle B being about 19 degrees) with respect to the end 143 of the cam section 140 and has its opposite end joined to an end of the other edge 146 of the notch 144. Edge 146 is in turn joined to a landing edge 147 at the end 143 of the cam section 140 to form a second step with the edge 146 at an angle C with respect to the axis 131 (the angle C being about 30 degrees). The notch 144 having edges 145 and 146 is thus formed between the leading edge 142 and the landing edge 147. The landing edge 147 is at an angle D (the angle D being about 30 degrees) with respect to the end 143 and extends from the end 143 of the cam section 140 to the trailing edge 148. The trailing edge 148 extends from the landing edge 147 to the end 141 of the cam section 140 and is at an angle E with respect to the axis 131 (the angle E being about 30 degrees).

Figure 14:
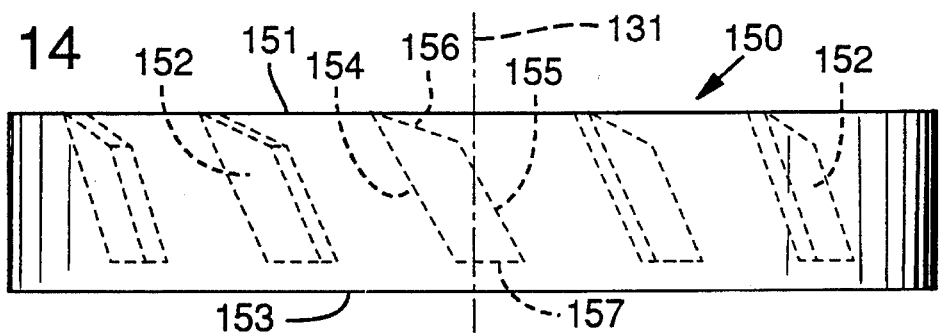
FIG. 14 is a view of an alternate index ring of the pulse actuated clutch of FIG. 10.
Figure 14A:
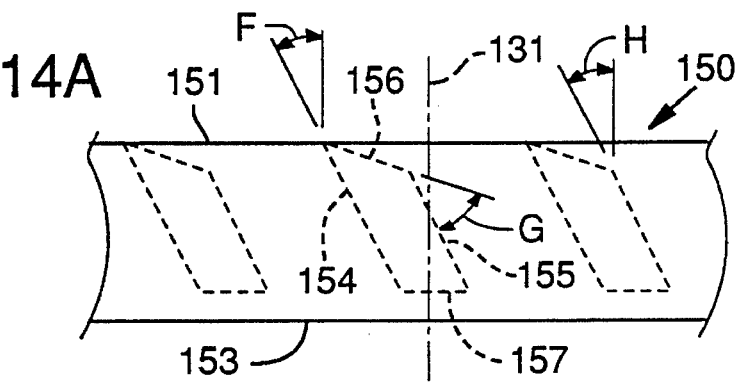
FIG. 14A is a flattened view of the cams of the index ring of FIG. 14.

The index ring 150 as shown in FIG. 11 is a ring shaped cylindrical member having raised cams 152 on its interior surface 149. Refer also to FIGS. 14 and 14A (14A shows the cams in flattened detail). As shown, the cams 152 have a leading edge 154 extending from end 151 at an angle F with respect to the longitudinal axis 131 of the ring 150 (the angle F being about 35 degrees). The leading edge 154 extends to a bottom edge 157 of the cam 152. The bottom edge 157 is near parallel to the lower end 153 of the ring 150 and extends from the leading edge 154 to a trailing edge 155. A landing edge 156 joined to the leading edge 154 at the end 151 extends at an angle G with respect to the edge 151 (the angle G being about 15 degrees) and is joined to the trailing edge 155. The trailing edge 155 extends from the landing edge 156 to the bottom edge 157 at an angle F (the angle F being about 30 degrees).

Refer once again to FIGS. 10 and 12. The clutch ring 110 is movable to a first position to be out of engagement with the inner gear 100 as shown in the lower half of FIG. 12 and to a second position where the clutch ring 110 is in engagement with the inner gear 100 as shown in the upper half of FIG. 12. The clutch ring 110 moved to the first position provides for independent rotation of the wheel 32 and the axle 30. The clutch ring 110 moved to the second position locks the rotation of the wheel 32 to the rotation of the axle 30 to provide unity of rotation.

The clutch ring 110 is urged to move to the first position by the return spring 120. The spring 120, being captive between the clutch ring 110 and the bushing 106 applies a force to the clutch ring 110 to move it to the first position. The clutch ring 110 is forced to move to the second position by a selectively controlled pulse of negative air pressure, that is, a partial vacuum is created within the defined air tight chamber defined by the sealing members previously described. Air is withdrawn from the chamber which applies a force to the diaphragm 160. The diaphragm 160 fitted to the piston 130 forces the piston to move. The piston 130 is in abutment with the clutch ring 110 and movement of the piston 130 causes the clutch ring 110 to move into engagement with the inner gear 100 with the clutch ring coming into abutment with the wave spring 122 as shown in the upper half of FIG. 12. The negative air pressure is controlled so that it is sufficient to overcome the biasing force of the return spring 120, but will not compress the wave spring 122. In this embodiment, the negative air pressure required to move the clutch ring into abutment with the wave spring 122 is on the order of eight inches of Hg. As air is withdrawn from the defined chamber, the diaphragm 160 will grip the cup 134 of the piston 130 due to the differential pressure acting on the diaphragm 160.

The piston 130 has its cams 132 in mesh with the cams 152 of the index ring 150. As the piston is moved the cams 132 and 152 will cooperatively cause the piston to rotate relative to the index ring and thus relative to the hub 80. Consider first the condition where the clutch ring 110 is out of engagement with the inner gear 100 as illustrated in the lower half of FIG. 12. The relative position of the cams 132 of the piston 130 and the cams 152 of the index ring are shown in FIG. 15A. The cams 132 and 152 are shown in flattened detail for illustrative purposes. As negative pressure is withdrawn from the defined chamber, the piston 130 will be moved axially, forcing the clutch ring toward engagement with the inner gear. As the piston is moved axially as indicated by arrow 180 in FIG. 15A, the leading edge 142 of cam 132 of the piston 130 will be in sliding engagement with the leading edge 154 of the cam 152 of the index ring 150. This will cause the piston 130 to rotate about the rotational axis 31 as indicated by arrow 182. The rotation of the piston 130 will twist the diaphragm 160 gripping the cup 134 of the piston to provide a resistive biasing torque on the piston 130. The diaphragm 160 can be considered to be a loadable biasing member, that is it does not provide any rotational biasing force until it is twisted. As the piston 130 is moved further as indicated in FIG. 15B, the leading edge 142 of the cam 132 will clear the leading edge 154 of the cam 152. When the leading edges 142 and 152 clear, the piston will have moved the clutch ring 110 into abutment with the wave spring 122 and into engagement with the inner gear 100 as shown in the top half of FIG. 12. The diaphragm 160 which has been rotationally twisted by the rotation of the piston, will cause the piston to rotate in the direction indicated by directional arrow 184. As the piston rotates as indicated by arrow 184, the edge 146 of the notch 144 will come into contact with the leading edge 154 of the cam 152 as indicated in FIG. 15C. The negative air pressure is released by venting the defined chamber to the atmosphere. The return spring 120 will urge the tip of the cam 152 (the tip being defined by the juncture of the leading edge 154 and the landing edge 156) to seat fully in the notch 144 of the cam 132 as shown in FIG. 15D. The clutch mechanism is thus in a latched position to couple (lock) the wheel 32 and the axle 30 together. With the pressure equalized on both sides of the diaphragm 160, the diaphragm releases its grip on the cup 134 of the piston 130. The negative air pressure is only applied for a short duration of time to affect latching of the clutch mechanism.

The wheel 32 is uncoupled from the axle 30, that is the clutch ring 110 is moved out of engagement with the inner gear 100 by applying a second selectively controlled pulse of negative air pressure to the defined chamber. The magnitude of the negative air pressure required to accomplish uncoupling is greater than the negative air pressure utilized to affect engagement. The negative air pressure required to accomplish uncoupling the wheel from the axle is on the order of fourteen inches of Hg and will hereafter be referred to as the second pressure. The second pressure is applied which causes the diaphragm 160 to once again grip the cup 134 of the piston 130. The second pressure is of sufficient magnitude to move the clutch ring 110 to compress the wave spring 122. The second pressure applied forces the piston 130 to move in the direction indicated by arrow 180 in FIG. 15E. As the piston 130 moves, the edge 146 of the notch 144 will be in sliding contact with the leading edge 154 of the cam 152. The edge 146 sliding along the leading edge 154 will cause the piston to rotate as indicated by arrow 182 in FIG. 15E. This will twist the diaphragm 160 to provide a resistive biasing torque. The piston continues to move in the direction indicated by arrow 180 further compressing the springs 120 and 122 until the edge 146 of the cam 132 clears the edge 154 of the cam 152. When the edges 146 and 152 clear, the biasing torque of the diaphragm 160 will rotate the piston 130 as indicated by arrow 184 in FIG. 15F. The piston 130 will rotate sufficiently to move the tip of the notch 144 past the tip of the cam 152 as indicated in FIG. 15F. The second pressure is released to equalize the pressure on both sides of the diaphragm 160. The diaphragm 160 will release its grip on the cup 134. The return springs 120 and 122 will force the landing edge 147 of the cam 132 against the landing edge 156 of the cam 152 as shown in FIG. 15G. The biasing force of the springs 120 and 122 will force the piston to move axially as indicated by arrow 186 and rotationally due to the cam action or ramping action of the edges 147 and 156 as indicated by arrow 184. The piston 130, in effect, will be indexed rotationally with respect to the index ring 150. It will be appreciated that the spring 122 will provide a biasing force until it fully expands in the groove 124 of the hub 80. The spring 120 continues to urge the clutch ring 110 and the piston 130 to move axially until the clutch ring 110 is out of engagement with the inner gear 100 and the diaphragm 160 comes into contact with the retainer 176. As the piston 130 moves axially as indicated by arrow 186 in FIG. 15H, it will also be rotated by the action of the cams 132, 152 as indicated by arrow 184. Only a pulse of the second pressure for a short duration is required to move the clutch ring out of engagement with the inner gear.

Figure 17:
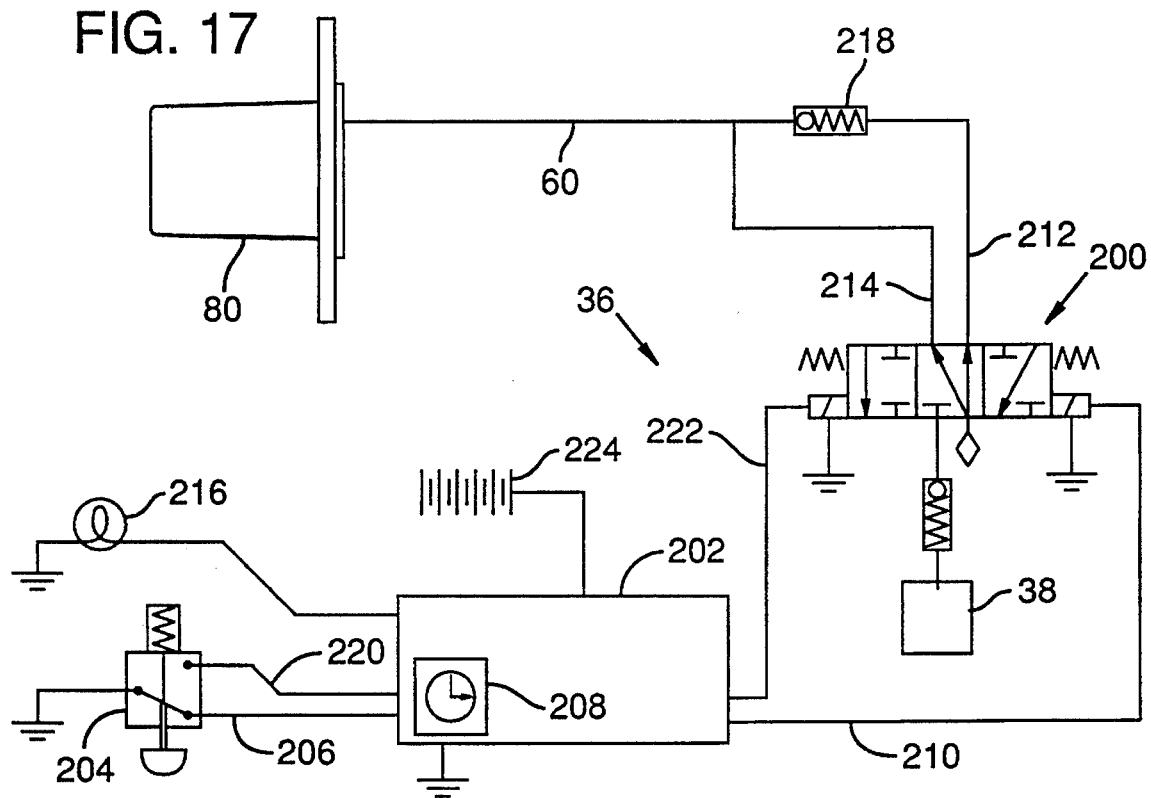

Refer now to FIG. 17 of the drawings. Controls 36 are provided to control the withdrawal and replenishment of air to the defined air tight chamber. In this embodiment, the intake manifold 34 of the engine 12 is utilized as a vacuum source. The reservoir 38 is coupled to the intake manifold 34 to ensure an adequate source of negative air pressure. The reservoir 38 is coupled to each of the front wheel hubs via a three way control valve 200 and the air line 60. In this embodiment, the valve 200 is normally closed with the center port (and thus the air line 60) vented to the atmosphere. The solenoid valve 200 is operated by a controller 202. The controller is enabled by the toggle switch 204. When the switch 204 is depressed or toggled as indicated in FIG. 17 to complete the circuit via line 206, a timer 208 of the controller is activated and the solenoid valve 200 is energized via line 210. The solenoid valve 200 energized via line 210 will open the port coupling the air line 212 to the reservoir 38 and close the center port. Air line 212 is thus coupled to the reservoir 38 (and the intake manifold 34) via the valve 200. A vacuum regulator 218 is provided in the air line 212 to limit the magnitude of the negative air pressure attained in the line 60 and thus the defined cavity (chamber) within the hub 80. The timer 208 will maintain the port connected to the air line 212 open for a set period of time that is sufficient to actuate the pulse operated clutch mechanism to move the clutch ring 110 into engagement with the inner gear 100 and latch the piston 130 in position on the index ring 150. When the time period has elapsed, the solenoid valve 200 is de-energized, the port coupling the air line 212 to the reservoir 38 is closed and the center port is once again opened to vent the defined chamber of the hub to the atmosphere via air line 60 and air lines 212 and 214. A lamp 216 connected to the engaging circuit is provided to indicate that the hubs are in the locked condition.

The hubs are unlocked by depressing the switch 204 to complete the circuit to the controller 202 via line 220. This will set the timer 208 for a new and different time period and will energize the solenoid valve 200 via line 222. The center port of the valve 200 will close and the port coupling the air line 214 to the reservoir 38 will be opened. Full negative pressure (vacuum) afforded by the vehicle 10 will be withdrawn from the hub 80 to affect uncoupling the wheel hub from the axle by unlatching the piston from the index ring as previously described. After the time period has elapsed, the solenoid valve 200 will be de-energized, the port coupling the line 214 to the reservoir 38 will be closed and the center port will be opened to vent the defined cavity of the hub to the atmosphere. The lamp 216 will be switched off at the end of the timed interval to indicate the hubs are no longer engaged. Power to operate the controller and the solenoid valve is provided by the vehicle battery 224.

Those skilled in the art will recognize that modifications and variations may be made without departing from the true spirit and scope of the invention. The invention is therefore not to be limited to the embodiments described and illustrated but is to be determined from the appended claims.

What is claimed is:

1. In a drive line of a vehicle, a pulse actuated clutch mechanism for selectively coupling and uncoupling a driving member and a driven member, the pulse actuated clutch mechanism comprising:

a driving member and a driven member;

a coupling member permanently and movably coupled to one of said driving and driven members, said coupling member movable to a first position to engage one of said driving and driven members and movable to a second position to be engaged with both of said driving and driven members;

a biasing member urging said coupling member to one of said first and second positions;

a movable piston structure for urging movement of said coupling member to the other of said first and second positions;

a latch mechanism strategically arranged for latching said movable piston structure to maintain said coupling member in said other of said first and second positions and unlatching said movable piston structure for urging said coupling member to said one of said first and second positions by said biasing member; and a pulse actuator that actuates pulsating movement of said movable piston structure to urge movement of the coupling member to said other of said first and second positions, said latching mechanism responsive to said pulsating movement of said movable piston structure to latch and unlatch said movable piston structure, said latch mechanism including first formations formed on said movable piston structure and second formations formed on one of said driving and driven members, one of said first and second formations having a first step, the other of said first and second formations engaged with said first step when said coupling member is urged by said movable piston structure to said other of the first and second positions in response to a first level of force of said pulse actuator, and said first and second formations remaining engaged at said first step upon removal of the pulse actuating force, wherein said pulse actuator has said first level of force and a second higher level of force, and wherein said one of said first and second formations has a second step, said first step being disengaged and said second step being engaged by the other of said formation in response to said second level of force, said coupling member being released from urging by the piston structure upon removal of said second level of force.

2. A pulse actuated clutch mechanism as defined in claim 1 including a control for controlling the actuation of said pulse actuator.

3. A pulse actuated clutch mechanism as defined in claim 1 wherein:

said driving member is a drive axle, said driven member is a wheel hub, said actuator is an air pressure source, and further including an air pressure chamber provided at one side of said movable piston structure and an air pressure line communicating said air pressure source with said air pressure chamber, and a control for controlling air pressure from said air pressure source to said air pressure chamber.

4. A pulse actuated clutch mechanism as defined in claim 1, further including:

said piston structure being rotatable relative to said one of said driving and driven members;

a loadable biasing member fitted to said piston structure for counter-rotating said piston structure;

said first and second formations on said piston structure and on said one of said driving and driven members cooperatively engaging each other to rotate said piston structure as said piston structure is moved by said pulsating force to urge the coupling member to said other of said first and second positions; and said loadable biasing member being loaded by rotation of said piston structure to urge counter-rotation of said piston structure and engagement of said formations at said first and second steps in response to the first and second levels of pulsating force, respectively.

5. A pulse actuated clutch mechanism as defined in claim 4, wherein:

said pulse actuator is an air pressure actuator, a pressure chamber provided at one side of said piston structure and an air pressure line communicating said pulse actuator with said pressure chamber, and further including a control for controlling the actuation of the pulse actuator.

6. A pulse actuated clutch mechanism as defined in claim 5 wherein said driving member is a drive axle and said driven member is a wheel hub.

7. A pulse actuated clutch mechanism as defined in claim 6 wherein the vehicle has an intake manifold that generates vacuum air pressure and said air pressure actuator is said manifold of the vehicle.

8. An impulse actuated clutch mechanism as defined in claim 7 wherein:

said loadable biasing member is a diaphragm fitted to said piston structure, said diaphragm forming a wall portion of said air chamber.

9. In a drive line of a vehicle, a pulse actuated clutch mechanism for selectively coupling and uncoupling a driving member and a driven member, the pulse actuated clutch mechanism comprising:

a driving member and a driven member;

a coupling member permanently and movably coupled to one of said driving and driven members, said coupling member movable to a first position to engage one of said driving and driven members and movable to a second position to be engaged with both of said driving and driven members;

a biasing member urging said coupling member to one of said first and second positions;

a movable piston structure including, a primary piston and a secondary piston for urging movement of said coupling member to the other of said first and second positions;

the secondary piston movably mounted in said primary piston and abutting said coupling member;

a second biasing member mounted between said primary and secondary pistons for urging movement of said secondary piston in said primary piston;

a latch mechanism strategically arranged for latching said movable piston structure to maintain said coupling member in said other of said first and second positions and unlatching said movable piston structure for urging said coupling member to said one of said first and second positions by said biasing member; and a pulse actuator that actuates pulsating movement of said movable piston structure to urge movement of the coupling member to said other of said first and second positions, said latching mechanism responsive to said pulsating movement of said movable piston structure to latch and unlatch said movable piston structure;

said pulse actuator urging movement of said primary piston to urge said second biasing member toward said secondary piston, said pulse actuator having alternate levels of pulsating force, a first level of force for opposing the first biasing member and compressing the second biasing member to a first dimension to latch the primary piston, and a second higher level of force for opposing the first biasing member and compressing the second biasing member to a second dimension to unlatch the primary piston.

10. A pulse actuated clutch mechanism as defined in claim 9, wherein:

said latch mechanism includes first formations formed on said primary piston and second formations formed on said one of said driving and driven members, one of said first and second formations having a first step, the other of said first and second formations engaged with said first step when said coupling member is urged by said primary piston to said other of the first and second positions in response to said first level of force of said pulse actuator, and said first and second formations remaining engaged at said first step to urge the coupling member to move to said other of said first and second positions upon removal of the pulse actuating force.

11. A pulse actuated clutch as defined in claim 10 wherein said one of said first and second formations has a second step, said first step being disengaged and said second step being engaged by the other of said formations in response to said second higher level of force, said coupling member being released from urging by the primary piston upon removal of said second pulse actuating force.

12. A pulse actuated clutch mechanism as defined in claim 10, further including:

said primary piston being rotatable relative to said one of said driving and driven members;

a loadable biasing member fitted to said primary piston for counter-rotating said primary piston;

said first and second formations on said primary piston and on said one of said driving and driven members cooperatively engaging each other to rotate said primary piston as said primary piston is moved by said pulsating force to urge the coupling member to said other of said first and second positions; and said loadable biasing member being loaded by rotation of said primary piston to urge counter-rotation of said primary piston and engagement of said formations at said first and second steps in response to the first and second levels of pulsating force, respectively.

13. A pulse actuated clutch mechanism as defined in claim 12, wherein:

said pulse actuator is an air pressure actuator, a pressure chamber provided at one side of said primary piston and an air pressure line communicating said pulse actuator with said pressure chamber, and further including a control for controlling the actuation of the pulse actuator.

14. A pulse actuated clutch mechanism as defined in claim 13 wherein said driving member is a drive axle and said driven member is a wheel hub.

15. A pulse actuated clutch mechanism as defined in claim 14 wherein the vehicle has an intake manifold that generates vacuum air pressure and said air pressure actuator is said manifold of the vehicle.

16. An impulse actuated clutch mechanism as defined in claim 15 wherein:

said loadable biasing member is a diaphragm fitted to said primary piston, said diaphragm forming a wall portion of said air chamber.

17. In a drive line of a vehicle, a pulse actuated clutch mechanism for selectively coupling and uncoupling a driving member and a driven member, the pulse actuated clutch mechanism comprising:

a driving member comprising a drive axle and a driven member comprising a wheel hub;

a coupling member permanently and movably coupled to one of said driving and driven members, said coupling member movable to a first position to engage one of said driving and driven members and movable to a second position to be engaged with both of said driving and driven members;

a biasing member urging said coupling member to one of said first and second positions;

a movable piston structure for urging movement of said coupling member to the other of said first and second positions;

a latch mechanism strategically arranged for latching said movable piston structure assembly to maintain said coupling member in said other of said first and second positions and unlatching said movable piston structure for urging said coupling member to said one of said first and second positions by said biasing member; and a pulse actuator comprising an air pressure source that actuates pulsating movement of said movable piston structure to urge movement of the coupling member to said other of said first and second positions, said latching mechanism responsive to said pulsating movement of said movable piston structure to latch and unlatch said movable piston structure;

an air pressure chamber provided at one side of said movable piston structure and an air pressure line communicating said air pressure source with said air pressure chamber, and a control for controlling air pressure from said air pressure source to said air pressure chamber; said control includes a three position valve in said air pressure line, one position of said valve communicating the air chamber to atmosphere, a second position communicating the air chamber to an air pressure limiter limiting the air pressure to a first level of air pressure, and then to the air pressure source, and a third position communicating the air chamber to the air pressure source while bypassing the air pressure limiter to provide the air chamber with a second higher level of air pressure.

18. A pulse actuated clutch as defined in claim 17 wherein said control includes a timer and a valve return for returning the valve to the first position following an allotted time after being engaged at either of said first or second positions and thereby returning the air chamber to atmospheric pressure.

19. In a drive line of a vehicle, a pulse actuated clutch mechanism for selectively coupling and uncoupling a driving member and a driven member, the pulse actuated clutch mechanism comprising:

a driving member and a driven member;

a coupling member permanently and movably coupled to one of said driving and driven members, said coupling member movable to a first position to engage one of said driving and driven members and movable to a second position to be engaged with both of said driving and driven members;

a biasing member urging said coupling member to one of said first and second positions;

a movable piston structure for urging movement of said coupling member to the other of said first and second positions;

a latch mechanism strategically arranged for latching said movable piston structure to maintain said coupling member in said other of said first and second positions and unlatching said movable piston structure for urging said coupling member to said one of said first and second positions by said biasing member;

a pulse actuator that actuates pulsating movement of said movable piston structure to urge movement of the coupling member to said other of said first and second positions, said latching mechanism responsive to said pulsating movement of said movable piston structure to latch and unlatch said movable piston structure; and a second biasing member abutting said coupling member when said coupling member is moved to said other of said first and second positions and cooperative with said first biasing member to resist further movement of said coupling member, said pulse actuator having alternate levels of pulsating force, a first level of force for opposing the first biasing member to latch the piston, and a second higher level of force for opposing the combined first and second biasing members to unlatch the piston.

* * * * *